US012804672B2

(12) United States Patent
Matsumura et al.

(10) Patent No.: US 12,804,672 B2

(45) Date of Patent: Nov. 17, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 286 days.

(21) Appl. No.: 18/697,294

(22) PCT Filed: Oct. 1, 2021

(86) PCT No.: PCT/JP2021/036429

§ 371 (c)(1),
(2) Date: Mar. 29, 2024

(87) PCT Pub. No.: WO2023/053445

PCT Pub. Date: Apr. 6, 2023

(65) Prior Publication Data

US 2024/0414728 A1 Dec. 12, 2024

(51) Int. Cl.

| | |
|---|---|
| ***H04W 72/23*** | (2023.01) |
| ***H04W 72/04*** | (2023.01) |
| ***H04W 72/0457*** | (2023.01) |
| ***H04W 72/231*** | (2023.01) |

(Continued)

(52) U.S. Cl.

CPC ..... *H04W 72/231* (2023.01); *H04W 72/0457* (2023.01); *H04W 72/566* (2023.01); *H04W 76/20* (2018.02)

(58) Field of Classification Search

CPC ............. H04W 72/23; H04W 72/0446; H04W 72/1273; H04W 72/046; H04W 72/1268; H04W 72/21; H04W 74/004; H04W 74/002; H04W 74/006

See application file for complete search history.

(56) References Cited

U.S. PATENT DOCUMENTS

| | | | | |
|---|---|---|---|---|
| 11,843,559 | B2 * | 12/2023 | Zhang .................. | H04B 7/0695 |
| 2020/0045569 | A1 * | 2/2020 | Seo ........................ | H04W 72/23 |
| 2021/0050936 | A1 | 2/2021 | Seo et al. | |
| 2023/0156845 | A1 * | 5/2023 | Khoshnevisan ........ | H04L 5/001 370/216 |

(Continued)

FOREIGN PATENT DOCUMENTS

| | | |
|---|---|---|
| JP | 2020-532900 A | 11/2020 |
| JP | 2020-535727 A | 12/2020 |

OTHER PUBLICATIONS

International Search Report issued in PCT/JP2021/036429 on Apr. 5, 2022 (7 pages).

(Continued)

*Primary Examiner* — Sai Aung

(74) *Attorney, Agent, or Firm* — Osha Bergman Watanabe & Burton LLP

(57) ABSTRACT

A terminal according to one aspect of the present disclosure includes: a control section that determines a downlink control channel (Physical Downlink Control Channel (PDCCH)) to monitor for PDCCHs in a plurality of control resource sets (CORESETs) overlapped in time, according to a transmission configuration indication state (TCI state) of only one CORESET selected based on a priority rule; and a receiving section that monitors the determined PDCCH. According to one aspect of the present disclosure, it is possible to appropriately handle collision of a plurality of downlink control channels.

7 Claims, 20 Drawing Sheets

(51) Int. Cl.
*H04W 72/566* (2023.01)
*H04W 76/20* (2018.01)

(56) References Cited

U.S. PATENT DOCUMENTS

| | | | | |
|---|---|---|---|---|
| 2023/0224726 | A1* | 7/2023 | Kim | H04B 7/024 370/329 |
| 2024/0023090 | A1* | 1/2024 | Yuan | H04W 72/232 |
| 2024/0244620 | A1* | 7/2024 | Li | H04L 5/0023 |
| 2024/0430898 | A1* | 12/2024 | Li | H04W 72/23 |

OTHER PUBLICATIONS

Written Opinion of the International Searching Authority issued in PCT/JP2021/036429 on Apr. 5, 2022 (3 pages).
LG Electronics; "Remaining issues on downlink control channel"; 3GPP TSG RAN WG1 Meeting #94, R1-1808490; Gothenburg, Sweden; Aug. 20-24, 2018 (9 pages).
Xiaomi; "Enhancements on Multi-TRP for PDCCH, PUSCH and PUCCH"; 3GPP TSG-RAN WG1 Meeting #106-e, R1-2107894; e-Meeting; Aug. 16-27, 2021 (20 pages).
Xiaomi; "Enhancements on HST-SFN operation for multi-TRP PDCCH transmission"; 3GPP TSG RAN WG1 #106-e, R1-2107897; e-Meeting; Aug. 16-27, 2021 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 8)"; Mar. 2010 (149 pages).

* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In previous Rel-15/16 NR specifications, a restriction (which may be referred to as a priority rule) is defined to ensure that a plurality of channels/signals correspond to the same quasi-co-location (QCL) type D in a case where the plurality of channels/signals collide or to avoid such a case.

For NR, it is studied that one or a plurality of transmission/reception points (TRPs) (multi-TRP (MTRP)) perform DL transmission to a terminal (user terminal, User Equipment (UE)). It is also studied that the UE performs UL transmission to the one or plurality of TRPs.

For Rel-17 NR, it is studied to support simultaneous reception of a plurality of QCL type D channels/signals in a UE. However, study has not advanced yet about control of collision of downlink control channels when a UE can receive a plurality of QCL type D channels/signals simultaneously. Unless this is studied, transmission/reception of the UE is restricted inappropriately, which may decrease throughput or degrade communication quality.

Thus, an object of the present disclosure is to provide a terminal, a radio communication method, and a base station that can appropriately handle collision of a plurality of downlink control channels.

Solution to Problem

A terminal according to one aspect of the present disclosure includes: a control section that determines a downlink control channel (Physical Downlink Control Channel (PDCCH)) to monitor for PDCCHs in a plurality of control resource sets (CORESETs) overlapped in time, according to a transmission configuration indication state (TCI state) of only one CORESET selected based on a priority rule; and a receiving section that monitors the determined PDCCH.

Advantageous Effects of Invention

According to one aspect of the present disclosure, it is possible to appropriately handle collision of a plurality of downlink control channels.

Figure 1:
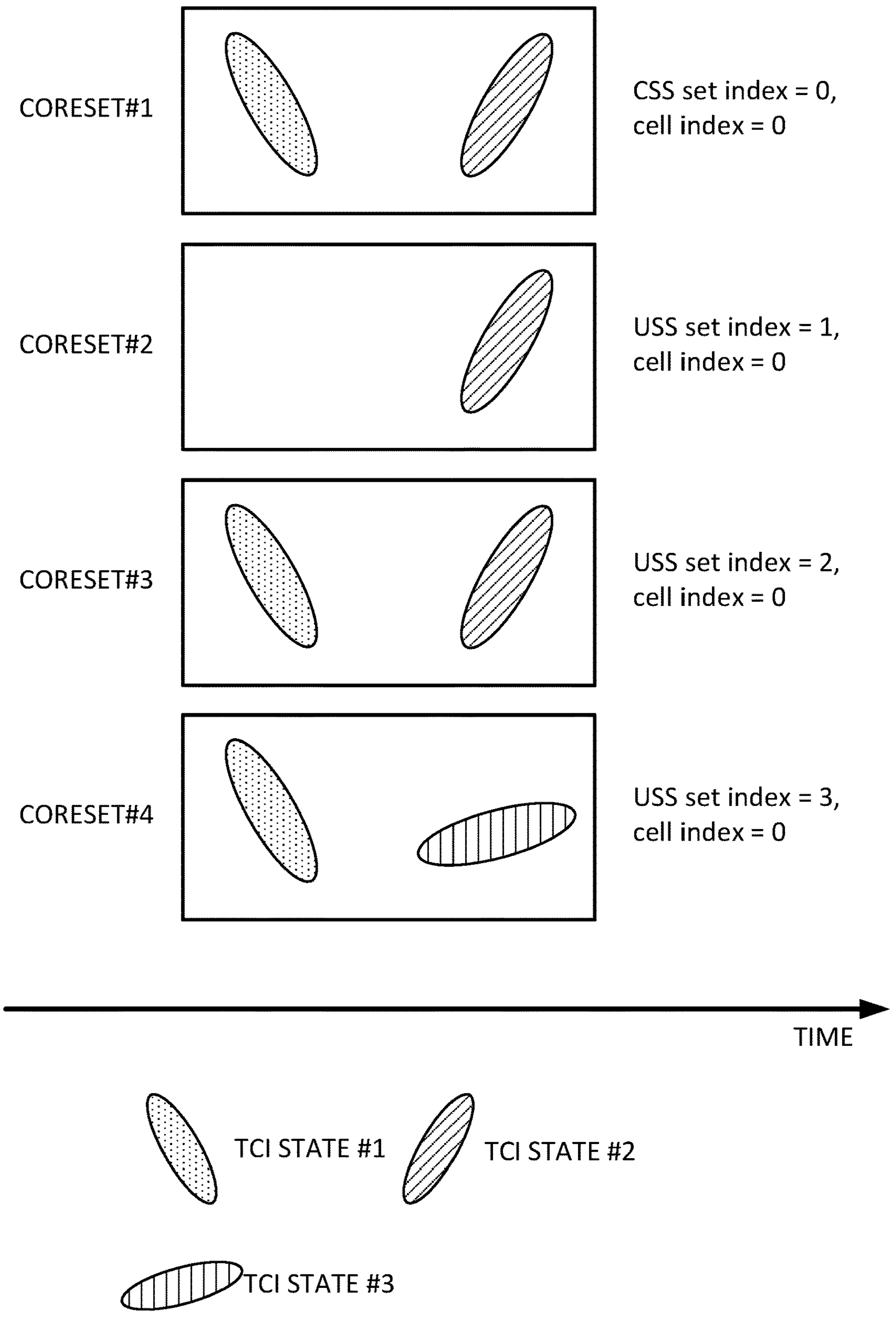
FIG. 1 is a diagram to show an example of a prioritized CORESET and other CORESETs monitored simultaneously in Embodiment 1.1.1.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (referred to as a signal/channel) in a UE, based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

Note that a channel/signal being a target of application of a TCI state may be referred to as a target channel/reference signal (RS) or simply as a target, and another signal described above may be referred to as a reference reference signal (reference RS) and a source RS or simply as a reference.

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), a reference signal for QCL detection (also referred to as a QRS), a demodulation reference signal (DMRS), and the like.

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS in a relationship of QCL type X with (a DMRS of) a certain channel/signal, and this RS may be referred to as a QCL source of QCL type X in the TCI state.

(Collision of Plurality of Channels/Signals)

In previous Rel-15/16 NR specifications, a UE can receive, detect, or monitor only channels/signals of the same QCL type D at the same time but cannot receive, detect, or monitor a plurality of channels/signals of different QCL types D at the same time. For this reason, in Rel-15/16 NR specifications, a restriction (which may be referred to as a priority rule, a QCL application rule, and the like) as that to be described below is defined to ensure that a plurality of channels/signals correspond to the same QCL type D in a case where the plurality of channels/signals collide (in other words, transmitted/received in overlapping times) or to avoid such a case.

Note that, in the present disclosure, a plurality of channels/signals colliding may mean reception (or transmission) of a plurality of channels/signals with different QCL types D being scheduled (or configured) in the same time resource (period).

In the present disclosure, (a reference RS) of the QCL type D of a certain channel/signal and (a reference RS) of the QCL type D of another channel/signal being different from each other may mean a beam used for communication of the certain channel/signal and a beam used for communication of such another channel/signal being different from each other. In the present disclosure, (a reference RS) of the QCL type D of a certain channel/signal and (a reference RS) of the QCL type D of another channel/signal being different from each other may be referred to as the certain channel/signal and such another channel/signal having different QCL types D, these channels/signals having different QCL type D properties, and being different in "QCL type D," and the like.

<PDCCH vs. PDCCH>

When the UE is configured with single-cell operation or configured with operation of carrier aggregation in the same frequency band, and PDCCH candidates are monitored in overlapped monitoring occasions in a plurality of CORESETs with the same or different QCL type D properties in an active DL BWP(s) in one or more cells, PDCCHs only in a certain CORESET and a CORESET with the same QCL type D property as that of the certain CORESET among the plurality of CORESETs are monitored.

This "certain CORESET" corresponds, if any, to a common search space (CSS) set with the lowest index in a cell with the lowest index including a CSS set, and otherwise corresponds to a UE-specific search space (USS) set with the lowest index in the cell with the lowest index. The lowest USS set index is determined over all the USS sets including at least one PDCCH candidate in overlapped PDCCH monitoring occasions.

In brief, when the UE monitors PDCCH candidates in overlapped monitoring occasions, the UE determines a monitoring-target CORESET, according to a priority rule that a CSS set is monitored at a higher priority than that of a USS set, and, among SS sets of the same type (CSS or USS), one with a lower index (in other words, with a lower cell index, and when the cell indices are the same, further with a lower SS set index) is monitored at a higher priority.

Note that an SS set index may correspond to a value configured by an RRC parameter SearchSpaceId for identifying a search space. Note that, in the present disclosure, a CSS set index may mean an SS set index for an SS set with a search space type (RRC parameter "searchSpaceType") indicating CSS. In the present disclosure, a USS set index may mean an SS set index for an SS set with a search space type (RRC parameter "searchSpaceType") indicating USS.

(Multi-TRP)

For a PDCCH/CORESET defined in Rel. 15, one TCI state without a CORESET pool index (CORESETPoolIndex) is configured for one CORESET.

For NR, it is studied that one or a plurality of transmission/reception points (TRPs) (multi-TRP (MTRP)) perform DL transmission to a UE. It is also studied that the UE performs UL transmission to the one or plurality of TRPs.

For enhancement of a PDCCH/CORESET defined in Rel. 16, a CORESET pool index is configured for each CORESET in multi-TRP based on multi-DCI.

In Rel. 17 and later versions, it is also assumed that repetition transmission (PDCCH repetition) is applied to a PDCCH(s) (or DCI(s)) transmitted from one or more TRPs. For example, it is considered to use a plurality of PDCCHs (or DCI(s)) transmitted from one or more TRPs, to perform scheduling or transmission/reception indication for one or more signals/channels.

The PDCCHs/DCIs to which repetition transmission is applied may be referred to as multi-PDCCH/multi-DCI. PDCCH repetition transmission, PDCCH repetition, a plurality of PDCCH transmissions, multi-PDCCH transmission or multiple PDCCH transmissions, MTR PDCCH, and the like may be interchangeably interpreted.

The multi-PDCCH/multi-DCI may be transmitted from different TRPs. The multi-PDCCH/DCI may be multiplexed by using time division multiplexing (TDM)/frequency division multiplexing (FDM)/space division multiplexing (SDM).

For example, when PDCCH repetition is performed by using TDM (TDM PDCCH repetition), a PDCCH may be transmitted by using a different time resource from each of the plurality of TRPs.

When FDM PDCCH repetition is performed, a PDCCH may be transmitted by using a different frequency resource from each of the plurality of TRPs. In FDM PDCCH repetition, at least one of two sets of resource element groups (REGs), a control channel element (CCE) of a PDCCH to be transmitted, two PDCCH repetitions to be transmitted and not overlapped in frequency, and multi-chance PDCCHs to be transmitted and not overlapped in frequency may be related to different TCI states.

When SDM PDCCH repetition is performed, PDCCHs may be transmitted from a plurality of TRPs by using the same time/frequency resource. In the SDM PDCCH repetition, PDCCH DMRSS of all the REGs/CCEs of the PDCCHs may be related to two TCI states. Note that, in the present disclosure, SDM may be interpreted as a single frequency network (SFN), and vice versa.

For example, in a case where a plurality of antennas (small antennas, transmission/reception points) with the same cell ID forms an SFN, two TCI states at maximum may be configured/activated for one CORESET by higher layer signaling (RRC signaling/MAC CE). The SFN may contribute to at least one of operation and reliability improvement of high speed trains (HSTs).

Note that, in non-SFN PDCCH repetition, two PDCCH candidates in two search space sets may be linked, and each of the search space sets may be associated with a corresponding CORESET. The two search space sets may be associated with the same or different CORESETs. One (one at maximum) TCI state may possibly be configured/activated for one CORESET by higher layer signaling (RRC signaling/MAC CE).

If two search space sets are associated with different CORESETs with different TCI states, this may mean repetition transmission by multi-TRP. If two search space sets are associated with the same CORESET (CORESETs having the same TCI state), this may mean repetition transmission by single-TRP.

A UE to which FDM/SDM PDCCH repetition is applied is supposed to be able to receive a plurality of beams (channels/signals of a plurality of QCL types D) simultaneously. However, study has not advanced yet about whether to follow the above-described restriction (priority rule) for control of collision of PDCCHS when a UE can receive a plurality of beams (channels/signals of a plurality of QCL types D) simultaneously. Unless this is studied, transmission/reception of the UE is restricted inappropriately, which may decrease throughput or degrade communication quality.

Thus, the inventors of the present invention came up with the idea of control that can appropriately handle collision of a plurality of PDCCHs.

Embodiments according to the present disclosure will be described in detail with reference to the drawings as follows. The radio communication methods according to respective embodiments may each be employed individually, or may be employed in combination.

In the present disclosure, "A/B" and "at least one of A and B" may be interchangeably interpreted. In the present disclosure, "A/B/C" may mean "at least one of A, B, and C."

In the present disclosure, activate, deactivate, indicate, select, configure, update, determine, and the like may be interchangeably interpreted. In the present disclosure, "support," "control," "can control," "operate," "can operate," and the like may be interchangeably interpreted.

In the present disclosure, radio resource control (RRC), an RRC parameter, an RRC message, a higher layer parameter, an information element (IE), a configuration, and the like may be interchangeably interpreted. In the present disclosure, a Medium Access Control control element (MAC Control Element (CE)), an update command, an activation/deactivation command, and the like may be interchangeably interpreted.

In the present disclosure, the higher layer signaling may be, for example, any one or combinations of Radio Resource Control (RRC) signaling, Medium Access Control (MAC) signaling, broadcast information, and the like.

In the present disclosure, the MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, the physical layer signaling may be, for example, downlink control information (DCI), uplink control information (UCI), or the like.

In the present disclosure, an index, an identifier (ID), an indicator, a resource ID, and the like may be interchangeably interpreted. In the present disclosure, a sequence, a list, a set, a group, a cluster, a subset, and the like may be interchangeably interpreted.

In the present disclosure, a panel, a UE panel, a panel group, a beam, a beam group, a precoder, an Uplink (UL) transmission entity, a transmission/reception point (TRP), a base station, spatial relation information (SRI), a spatial relation, an SRS resource indicator (SRI), a control resource set (CORESET), a Physical Downlink Shared Channel (PDSCH), a codeword (CW), a transport block (TB), a reference signal (RS), an antenna port (for example, a demodulation reference signal (DMRS) port), an antenna port group (for example, a DMRS port group), a group (for example, a spatial relation group, a code division multiplexing (CDM) group, a reference signal group, a CORESET group, a Physical Uplink Control Channel (PUCCH) group, a PUCCH resource group), a resource (for example, a reference signal resource, an SRS resource), a resource set (for example, a reference signal resource set), a CORESET pool, a downlink Transmission Configuration Indication state (TCI state) (DL TCI state), an uplink TCI state (UL TCI state), a unified TCI state, a common TCI state, quasi-co-location (QCL), QCL assumption, and the like may be interchangeably interpreted.

A spatial relation information Identifier (ID) (TCI state ID) and spatial relation information (TCI state) may be interchangeably interpreted. The "spatial relation information" may be interpreted as a "set of pieces of spatial relation information," "one or a plurality of pieces of spatial relation information," and the like, and vice versa. A TCI state and TCI may be interchangeably interpreted.

The panel may be related to at least one of a group index of an SSB/CSI-RS group, a group index of group-based beam report, and a group index of an SSB/CSI-RS group for group-based beam report.

In the present disclosure, it may be assumed that a single PDCCH is supported when multi-TRP uses ideal backhaul. It may be assumed that multi-PDCCH is supported when multi-TRP uses non-ideal backhaul.

Note that the ideal backhaul may be referred to as DMRS port group type 1, reference signal related group type 1, antenna port group type 1, CORESET pool type 1, and the like. The non-ideal backhaul may be referred to as DMRS port group type 2, reference signal related group type 2, antenna port group type 2, CORESET pool type 2, and the like. Names are not limited to these.

In the present disclosure, multi-TRP, multi-TRP system, multi-TRP transmission, and multi-PDSCH may be interchangeably interpreted.

In the present disclosure, single DCI (sDCI), a single PDCCH, a multi-TRP system based on single DCI, sDCI-based MTRP, and two TCI states in at least one TCI codepoint being activated may be interchangeably interpreted.

In the present disclosure, multi-DCI (mDCI), multi-PDCCH, a multi-TRP system based on multi-DCI, mDCI-based MTRP, and two CORESET pool indices or CORESET pool index=1 (or a value equal to one or greater) being configured may be interchangeably interpreted.

In the present disclosure, QCL and QCL type D may be interchangeably interpreted.

Note that a description will be given by assuming that the following embodiments are applied when a UE supports simultaneous reception of channels/signals of two or more different QCL types D, but the following embodiments may be applied to other cases.

In the present disclosure, "TCI state A has the same QCL type D as that of TCI state B," "TCI state A and TCI state B are the same," "TCI state A is QCL type D with TCI state B," and the like may be interchangeably interpreted.

In the present disclosure, a plurality of CORESETs are overlapped may mean monitoring occasions of the plurality of CORESETs are overlapped. In the present disclosure, a plurality of CORESETs are overlapped may mean that monitoring occasions of the plurality of CORESETs are present at the same symbol(s) in a bandwidth part (BWP)/in a component carrier (CC)/in a band/in a frequency range/in a UE (note that "in a UE" may be interpreted as in all the frequencies/in all the bands and the like). In the present disclosure, a CORESET with a TCI state may mean that a CORESET for which the TCI state is activated (or with an active TCI state or indicated with an active TCI state). In the present disclosure, a CORESET with one TCI state may mean a CORESET with only one TCI state.

(Radio Communication Method)

First Embodiment

A first embodiment relates to an SFN PDCCH repetition scheme.

In the first embodiment, one or more TCI states may be activated per CORESET. A UE may be notified of activation of a TCI state for a CORESET by using a MAC CE.

In the first embodiment, in a case where a plurality of PDCCHs of different QCL types D collide, the UE determines a PDCCH (CORESET) to monitor, based on at least one of priority rules to be described in Embodiments 1.1 to 1.3. The individual embodiments will be described below.

In the following, in the present disclosure, a monitoring-target CORESET determined based on a priority rule will also be referred to simply as a "prioritized CORESET", a CORESET at the highest priority, and the like.

Embodiment 1.1

A priority rule of Embodiment 1.1 is the same as that in Rel-16 NR. In other words, the UE determines a prioritized CORESET according to a priority rule that a CSS set is monitored at a higher priority than that of a USS set, and, among SS sets of the same type (CSS or USS), one with a lower index (in other words, with a lower cell index, and when the cell indices are the same, further with a lower SS set index) is monitored at a higher priority Embodiment 1.1 can be further broadly classified into two:

Embodiment 1.1.1: a prioritized CORESET has two active TCI states (two QCL types D) and Embodiment 1.1.2: a prioritized CORESET has one active TCI state (one QCL type D).

Embodiment 1.1.1

For a CORESET being other than the prioritized CORESET and having one active TCI state, when the one active TCI state is the same QCL type D as any of that of either of the two active TCI states of the prioritized CORESET, the UE may monitor this CORESET.

For a CORESET being other than the prioritized CORESET and having two active TCI states, the UE may monitor this CORESET when condition (1.1.1a) or (1.1.1b) below is satisfied:

(1.1.1a) the two active TCI states have the same QCL types D as those of the two active TCI states of the prioritized CORESET and (1.1.1b) one of the two active TCI states has the same QCL type D as that of one of the two active TCI states of the prioritized CORESET.

Note that, when (1.1.1b) above is satisfied, the UE applies only the TCI state of the same QCL type D as that of one of the two active TCI states of the prioritized CORESET to monitor the above CORESET.

FIG. 1 is a diagram to show an example of a prioritized CORESET and other CORESETs monitored simultaneously in Embodiment 1.1.1. In the present example, four CORESETs (CORESETs #1 to #4) are overlapped in time.

CORESET #1 corresponds to CSS set index=0 and cell index=0 and has two active TCI states (TCI states #1 and #2).

CORESET #2 corresponds to USS set index=1 and cell index=0 and has one active TCI state (TCI state #2).

CORESET #3 corresponds to USS set index=2 and cell index=0 and has two active TCI states (TCI states #1 and #2).

CORESET #4 corresponds to USS set index=3 and cell index=0 and has two active TCI states (TCI states #1 and #3).

In the case in FIG. 1, the UE first selects CORESET #1 corresponding to a CSS set as a prioritized CORESET. CORESET #1 has two active TCI states and hence corresponds to operation in Embodiment 1.1.1.

The one TCI state of CORESET #2 has the same QCL type D as that of TCI state #2 of the prioritized CORESET, and hence the UE monitors CORESET #2.

The two TCI states of CORESET #3 have the same QCL types D as those of TCI states #1 and #2 of the prioritized CORESET, and hence the UE monitors CORESET #3.

One of the two TCI states of CORESET #4 has the same QCL type D as that of TCI state #1 of the prioritized CORESET, while the other has a different QCL type D (TCI state #3) from that of TCI state #2 of the prioritized CORESET. Hence, the UE following (1.1.1a) above does not monitor CORESET #4. The UE following (1.1.1b) above applies only TCI state #1 to monitor CORESET #4.

Embodiment 1.1.2

For Embodiment 1.1.2, a prioritized CORESET having one active TCI state that is determined first according to the same priority rule as that in Rel-16 NR is also referred to as a first prioritized CORESET, and a prioritized CORESET that is determined next and is other than the first prioritized CORESET is also referred to as a second prioritized CORESET. The second prioritized CORESET may be referred to as a CORESET X.

The one active TCI state of the first prioritized CORESET may be referred to as a first priority TCI state (1st priority TCI state). Any of the active TCI states of the second prioritized CORESET may be referred to as a second priority TCI state (2nd priority TCI state).

Embodiment 1.1.2 is broadly divided into Embodiments 1.1.2.1 and 1.1.2.2 depending on the method of determining a second prioritized CORESET.

Embodiment 1.1.2.1

The second prioritized CORESET may be determined from among remaining CORESETs to collide excluding the first prioritized CORESET, according to a similar priority rule to that in Rel. 16. In other words, the second prioritized CORESET may correspond, if any, to a CSS set with the lowest index in a cell with the lowest index including CSS sets among the remaining CORESETs to collide, and otherwise, to a USS set with the lowest index in the cell with the lowest index. The lowest USS set index is determined over all the USS sets including at least one PDCCH candidate in overlapped PDCCH monitoring occasions.

When a candidate for the second prioritized CORESET derived according to the above priority rule has only one active TCI state and when the active TCI state is the same as the first priority TCI state, the next candidate (CORESET corresponding to the SS set/cell of the next lowest index) may be searched as a candidate for the second prioritized CORESET. In other words, for a CORESET having only one active TCI state, the UE may continue searching for the second prioritized CORESET until the active TCI state turns to be one different from the first priority TCI state.

When a CORESET having only one active TCI state different from the first priority TCI state is found according to the priority rule, the UE may determine this active TCI state as the second priority TCI state and determine this CORESET as the second prioritized CORESET.

Note that, even when a candidate for the second prioritized CORESET derived according to the above priority rule only has one active TCI state and when the active TCI state is the same as the first priority TCI state, the UE may determine this active TCI state as the second priority TCI state and determine this candidate as the second prioritized CORESET. In this case, since the second prioritized CORESET is the same as the first prioritized CORESET, this may be expressed as no second prioritized CORESET.

When a candidate for the second prioritized CORESET derived according to the above priority rule has two active TCI states and when one of the two active TCI states is the same as the first priority TCI state, the UE may determine the other of the two active TCI states as the second priority TCI state and may determine this candidate as the second prioritized CORESET.

When a candidate for the second prioritized CORESET derived according to the above priority rule has two active TCI states and when both of the two active TCI states are different from the first priority TCI state, the UE may determine one of the two active TCI states as the second priority TCI state and may determine this candidate as the second prioritized CORESET. This one TCI state may be the one having the lowest or highest TCI state ID among the two active TCI states or may be the one corresponding to the first or second TCI state activated by a MAC CE.

Figure 2:
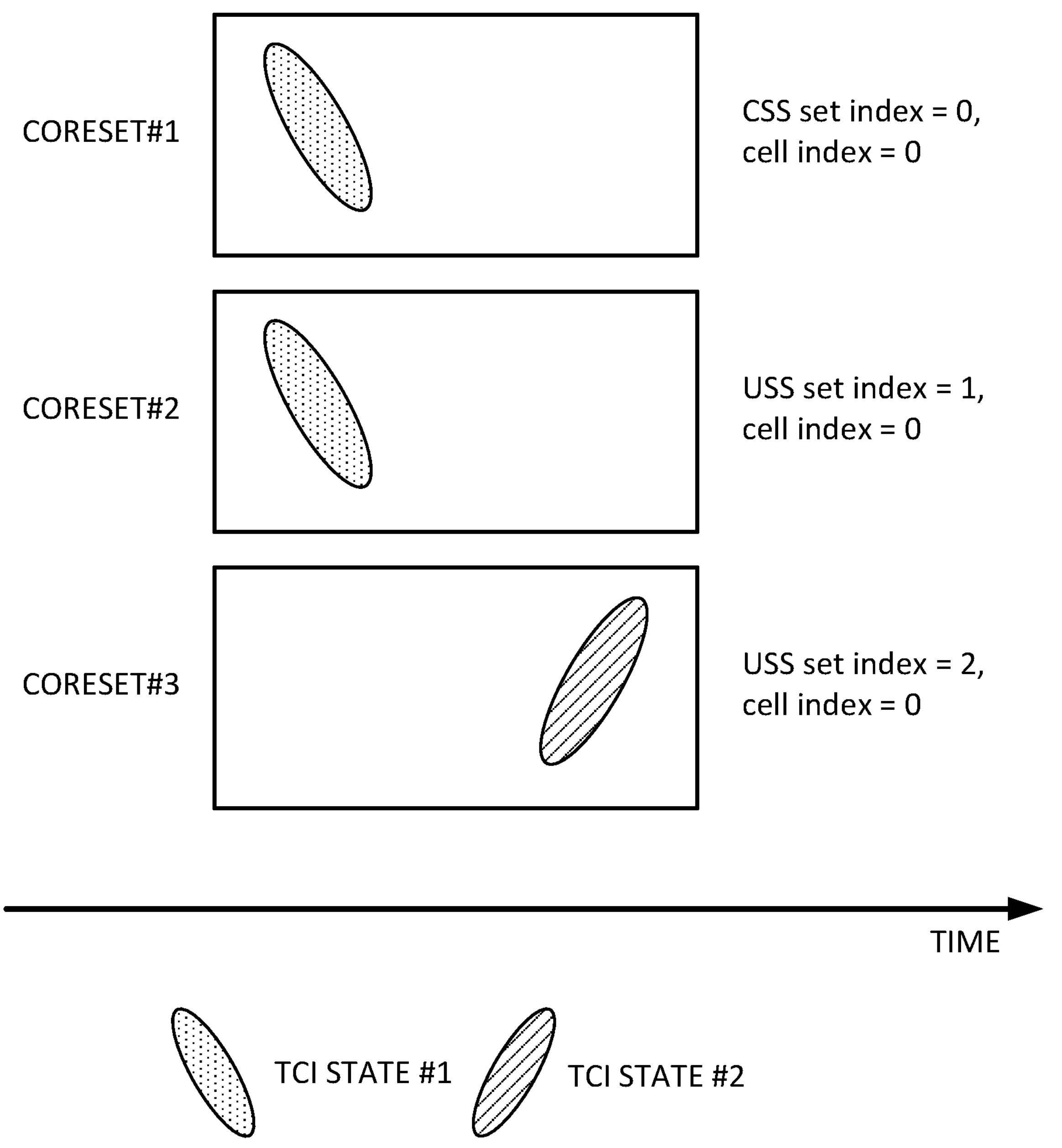
FIG. 2 is a diagram to show an example of a prioritized CORESET in Embodiment 1.1.2.1.

FIG. 2 is a diagram to show an example of a prioritized CORESET in Embodiment 1.1.2.1. In the present example, three CORESETS (CORESETs #1 to #3) are overlapped in time.

CORESET #1 corresponds to CSS set index=0 and cell index=0 and has one active TCI state (TCI state #1).

CORESET #2 corresponds to USS set index=1 and cell index=0 and has one active TCI state (TCI state #1).

CORESET #3 corresponds to USS set index=2 and cell index=0 and has one active TCI state (TCI state #2).

In the case in FIG. 2, the UE first selects CORESET #1 corresponding to a CSS set as a prioritized CORESET. CORESET #1 has one active TCI state and hence corresponds to operation in Embodiment 1.1.2. This prioritized CORESET corresponds to the first prioritized CORESET, and TCI state #1 corresponds to the first priority TCI state.

The UE next searches for the second prioritized CORESET. The one TCI state of CORESET #3 is different from TCI state #1 of the prioritized CORESET, and hence the UE determines this TCI state #2 as the second priority TCI state and determines CORESET #3 as the second prioritized CORESET, for monitoring.

Figure 3:
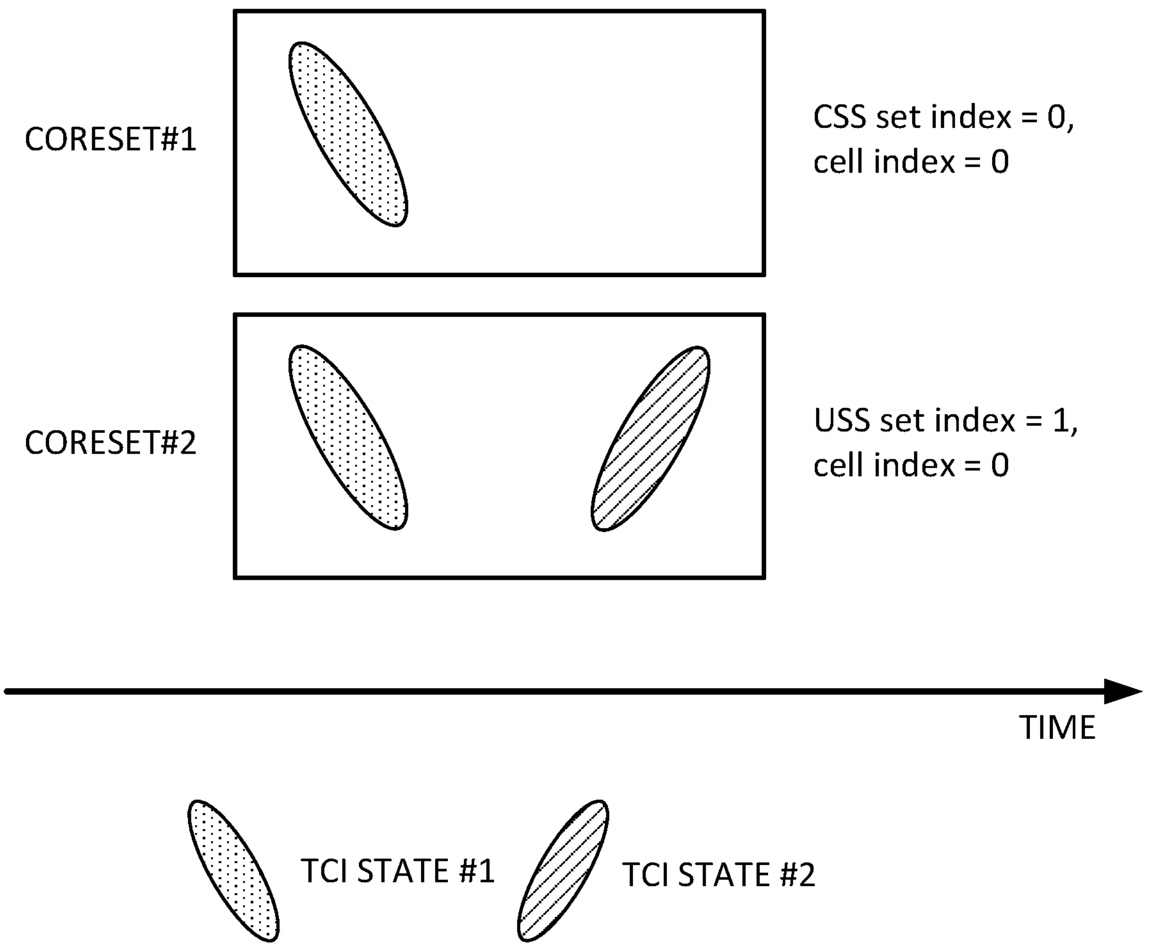
FIG. 3 is a diagram to show an example of the prioritized CORESET in Embodiment 1.1.2.1.

FIG. 3 is a diagram to show an example of a prioritized CORESET in Embodiment 1.1.2.1. In the present example, two CORESETS (CORESETs #1 and #2) are overlapped in time.

CORESET #1 corresponds to CSS set index=0 and cell index=0 and has one active TCI state (TCI state #1).

CORESET #2 corresponds to USS set index=1 and cell index=0 and has two active TCI states (TCI states #1 and #2).

In the case in FIG. 3, the UE first selects CORESET #1 corresponding to a CSS set as a prioritized CORESET. CORESET #1 has one active TCI state and hence corresponds to the operation in Embodiment 1.1.2. This prioritized CORESET corresponds to the first prioritized CORESET, and TCI state #1 corresponds to the first priority TCI state.

The UE then searches for the second prioritized CORESET. One of the two active TCI states of CORESET #2 is the same as the first priority TCI state, and hence the UE determines the other (TCI state #2) of the two active TCI states as the second priority TCI state and determines CORESET #2 as the second prioritized CORESET, for monitoring.

Figure 4:
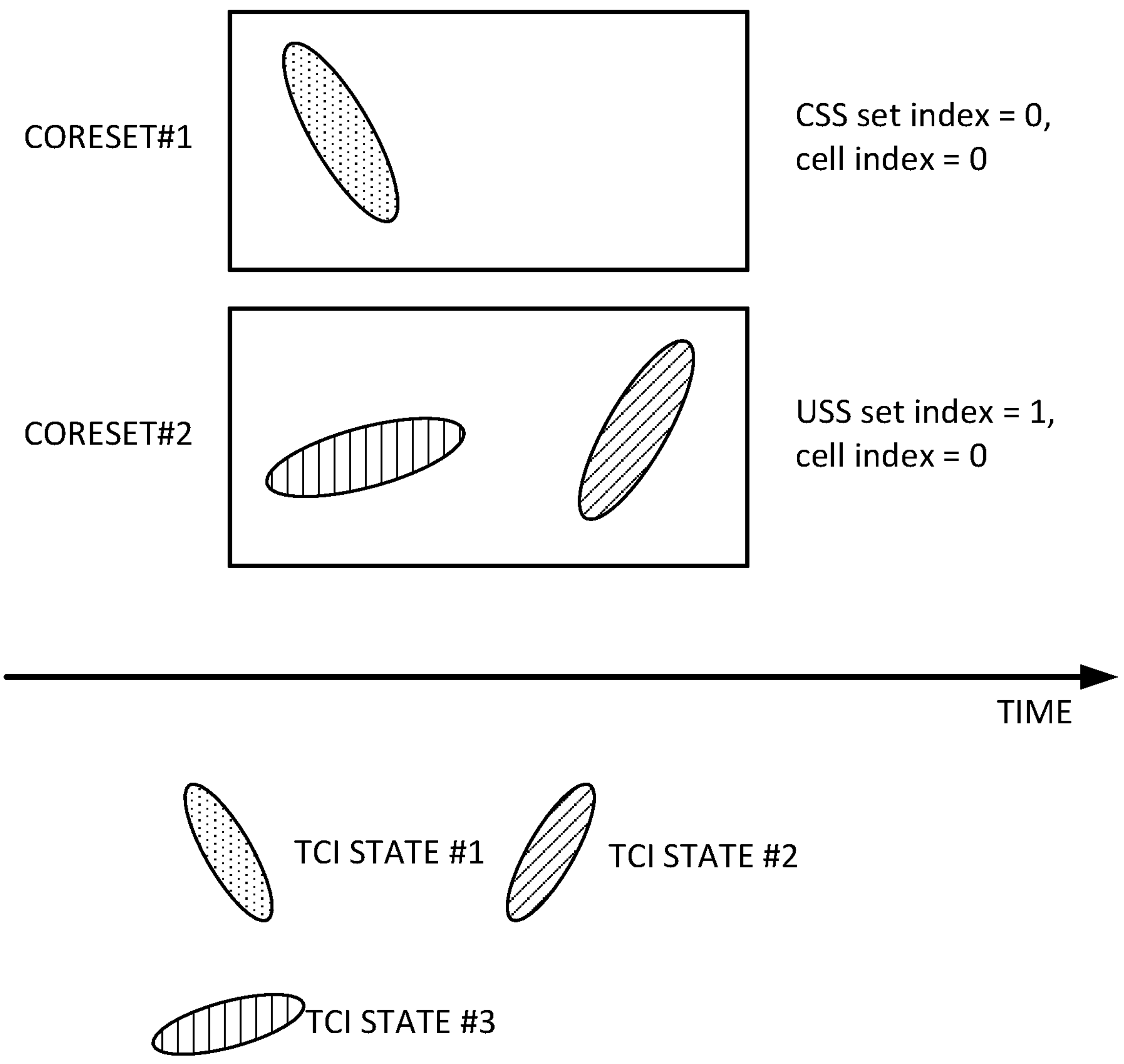
FIG. 4 is a diagram to show an example of the prioritized CORESET in Embodiment 1.1.2.1.

FIG. 4 is a diagram to show an example of a prioritized CORESET in Embodiment 1.1.2.1. In the present example, two CORESETs (CORESETs #1 and #2) are overlapped in time.

CORESET #1 corresponds to CSS set index=0 and cell index=0 and has one active TCI state (TCI state #1).

CORESET #2 corresponds to USS set index=1 and cell index=0 and has two active TCI states (TCI states #3 and #2).

In the case in FIG. 4, the UE first selects CORESET #1 corresponding to a CSS set as a prioritized CORESET. CORESET #1 has one active TCI state and hence corresponds to the operation in Embodiment 1.1.2. This prioritized CORESET corresponds to the first prioritized CORESET, and TCI state #1 corresponds to the first priority TCI state.

The UE then searches for the second prioritized CORESET. Both of the two active TCI states of CORESET #2 are different from the first priority TCI state, and hence the UE determines the TCI state (TCI state #3) having the highest TCI state ID of the two active TCI states as the second priority TCI state, determines CORESET #2 as the second prioritized CORESET, and applies only TCI state #3 for monitoring a PDCCH candidate in CORESET #2.

Embodiment 1.1.2.2

The UE first determines a subset of CORESETs each having two active TCI states and also having one of the two TCI states being the same as the first priority TCI state, from among the remaining CORESETs to collide excluding the first prioritized CORESET.

The UE then determines the second prioritized CORESET from the subset according to a similar priority rule to that of Rel. 16. In other words, the second prioritized CORESET may correspond, if any, to a CSS set with the lowest index in a cell with the lowest index including CSS sets among the CORESETs included in the subset, and otherwise, to a USS set with the lowest index in a cell with the lowest index. The lowest USS set index is determined over all the USS sets including at least one PDCCH candidate in overlapped PDCCH monitoring occasions.

The second priority TCI state corresponds to the one different from the first priority TCI state among the active TCI states of the second prioritized CORESET.

In Embodiment 1.1.2.2, both the first priority TCI state and the second priority TCI state can be used to monitor a PDCCH candidate (CORESET) in the second prioritized CORESET.

Figure 5:
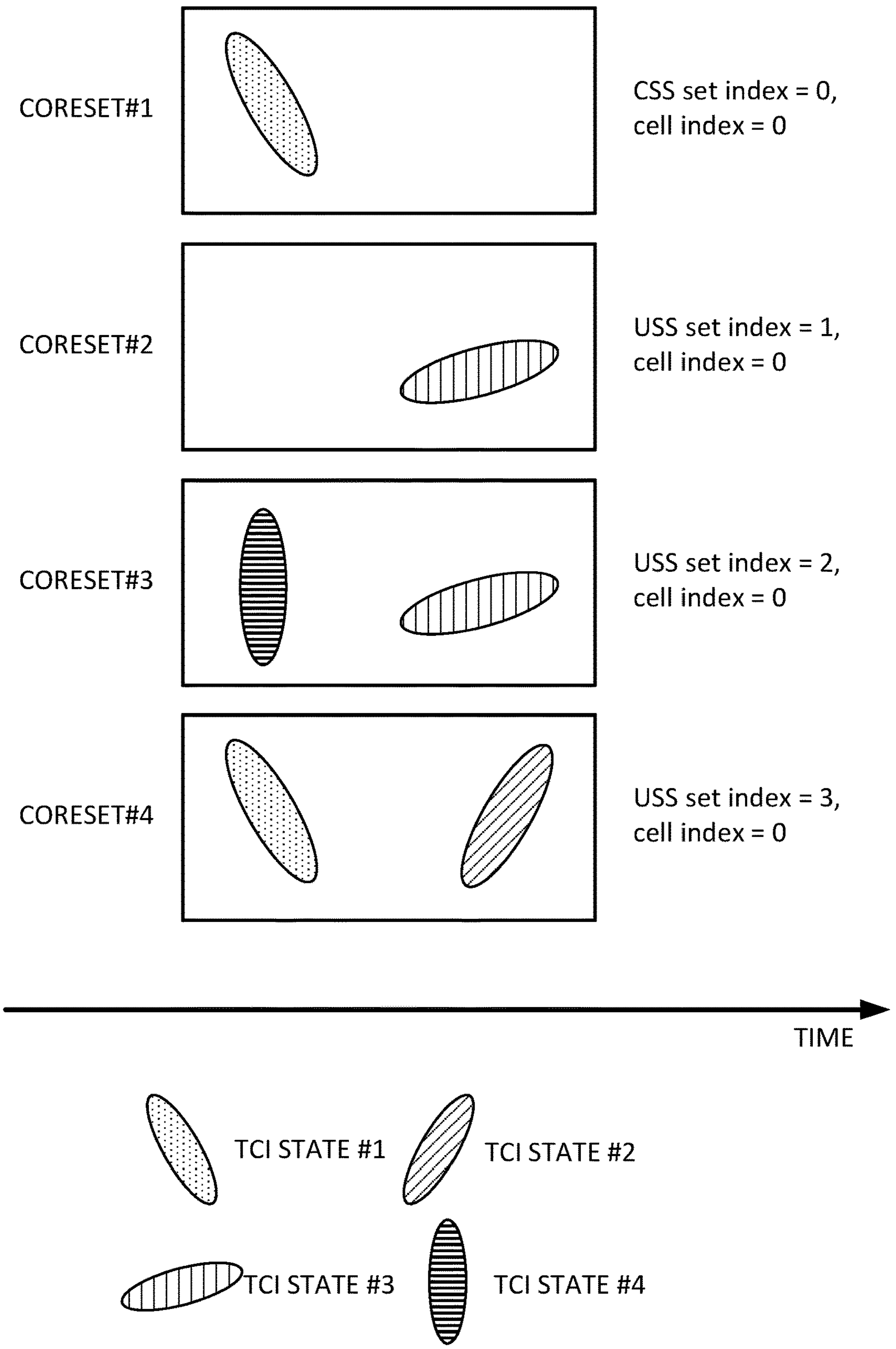
FIG. 5 is a diagram to show an example of a prioritized CORESET in Embodiment 1.1.2.2.

FIG. 5 is a diagram to show an example of a prioritized CORESET in Embodiment 1.1.2.2. In the present example, four CORESETS (CORESETs #1 to #4) are overlapped in time.

CORESET #1 corresponds to CSS set index=0 and cell index=0 and has one active TCI state (TCI state #1).

CORESET #2 corresponds to USS set index=1 and cell index=0 and has one active TCI state (TCI state #3).

CORESET #3 corresponds to USS set index=2 and cell index=0 and has two active TCI states (TCI states #3 and #4).

CORESET #4 corresponds to USS set index=3 and cell index=0 and has two active TCI states (TCI states #1 and #2).

In the case in FIG. 5, the UE first selects CORESET #1 corresponding to a CSS set as a prioritized CORESET. CORESET #1 has one active TCI state and hence corresponds to the operation in Embodiment 1.1.2. This prioritized CORESET corresponds to the first prioritized CORESET, and TCI state #1 corresponds to the first priority TCI state.

The UE then searches for the second prioritized CORESET. A CORESET having two active TCI states and also having one of the TCI states being the same as the first priority TCI state among remaining CORESETs #2 to #4 is CORESET #4 only. Hence, the UE determines TCI state #2 different from the first priority TCI state among the TCI states of CORESET #4 as the second priority TCI state, determines CORESET #4 as the second prioritized CORESET, and applies TCI states #1 and #2 to monitor a PDCCH candidate in CORESET #4.

{{CORESET(s) Other than Prioritized CORESETs}}

Monitoring of a CORESET(s) other than the prioritized CORESETs (first prioritized CORESET and second prioritized CORESET) in Embodiment 1.1.2 will be described.

For a CORESET being other than the prioritized CORESETs and having one active TCI state, the UE may monitor this CORESET when condition (1.1.2a) or (1.1.2b) below is satisfied:

(1.1.2a) the one active TCI state has the same QCL type D as that of the first priority TCI state and (1.1.2b) the one active TCI state has the same QCL type D as that of the first priority TCI state or the second priority TCI state.

Figure 6:
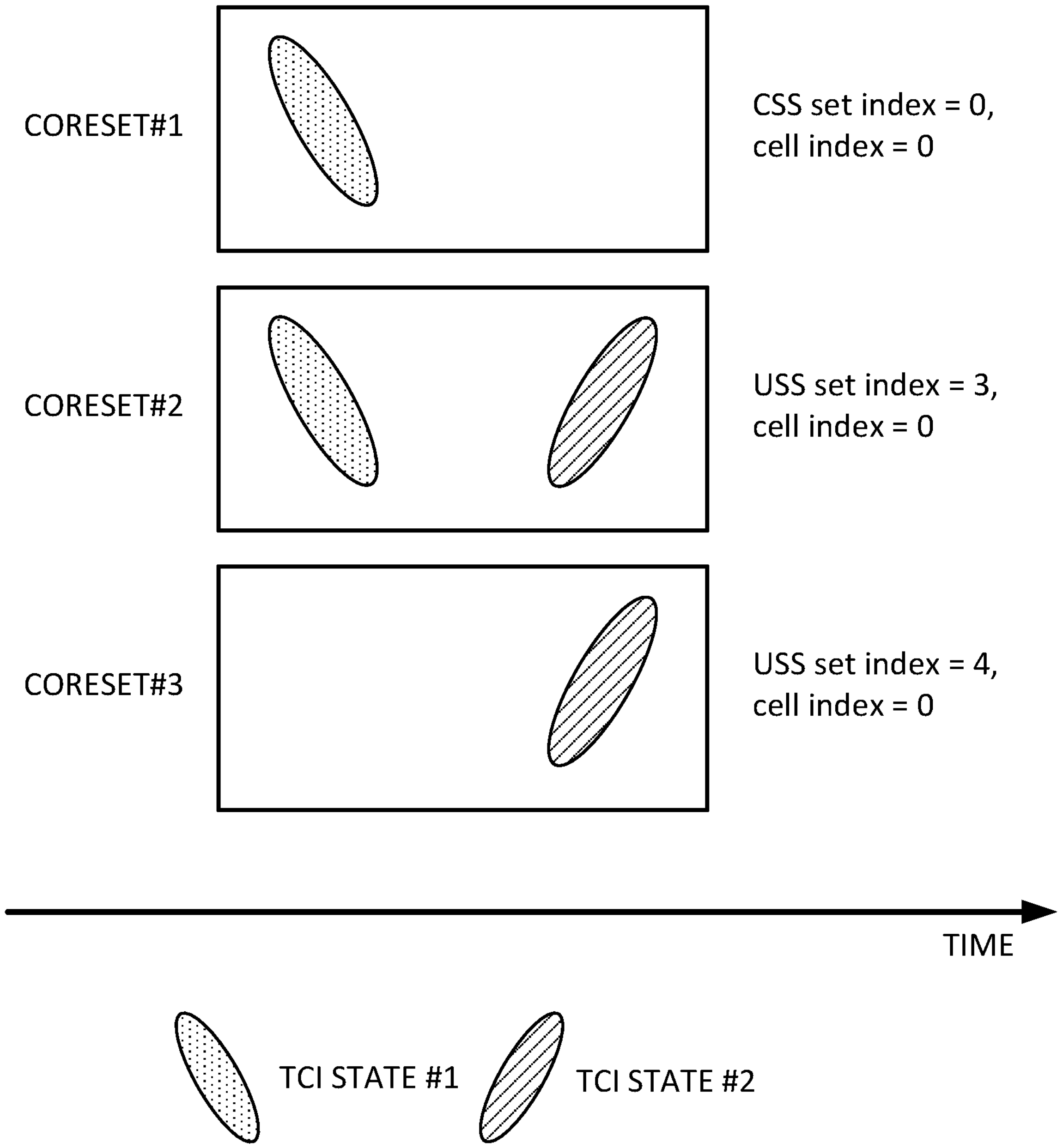
FIG. 6 is a diagram to show an example of a prioritized CORESET and other CORESETs monitored simultaneously in Embodiment 1.1.2.

FIG. 6 is a diagram to show an example of a prioritized CORESET and other CORESETs monitored simultaneously in Embodiment 1.1.2. In the present example, three CORESETs (CORESETs #1 to #3) are overlapped in time.

CORESET #1 corresponds to CSS set index=0 and cell index=0 and has one active TCI state (TCI state #1).

CORESET #2 corresponds to USS set index=3 and cell index=0 and has two active TCI states (TCI states #1 and #2).

CORESET #3 corresponds to USS set index=4 and cell index=0 and has one active TCI state (TCI state #2).

In the case in FIG. 6, the UE first selects CORESET #1 corresponding to a CSS set as a prioritized CORESET. CORESET #1 has one active TCI state and hence corresponds to the operation in Embodiment 1.1.2. This prioritized CORESET corresponds to the first prioritized CORESET, and TCI state #1 corresponds to the first priority TCI state.

The UE next searches for the second prioritized CORESET. A CORESET having two active TCI states and also having one of the TCI states being the same as the first priority TCI state between remaining CORESETs #2 and #3 is CORESET #2 only. Hence, the UE determines TCI state #2 different from the first priority TCI state of the TCI states of CORESET #2 as the second priority TCI state, determines CORESET #2 as the second prioritized CORESET, and applies TCI states #1 and #2 to monitor a PDCCH candidate in CORESET #2.

When the UE takes condition (1.1.2a) into account, the UE does not monitor CORESET #3. When the UE takes condition (1.1.2b) into account, the UE monitors CORESET #3.

For a CORESET being other than the prioritized CORESETs and having two active TCI states, the UE may monitor this CORESET when condition (1.1.2c), (1.1.2d), or (1.1.2e) below is satisfied:

(1.1.2c) the two active TCI states have the same QCL types D as those of the first priority TCI state and the second priority TCI state, (1.1.2d) one of the two active TCI states has the same QCL type D as that of the first priority TCI state, and (1.1.2e) one of the two active TCI states has the same QCL type D as that of the first priority TCI state or the second priority TCI state.

Note that, when (1.1.2d) above is satisfied, the UE monitors the above CORESET by applying only the TCI state of the same QCL type D as that of the first priority TCI state.

Note that, when (1.1.2e) above is satisfied, the UE applies only the TCI state of the same QCL type D as that of the first priority TCI state or the second priority TCI state to monitor the above CORESET.

Figure 7:
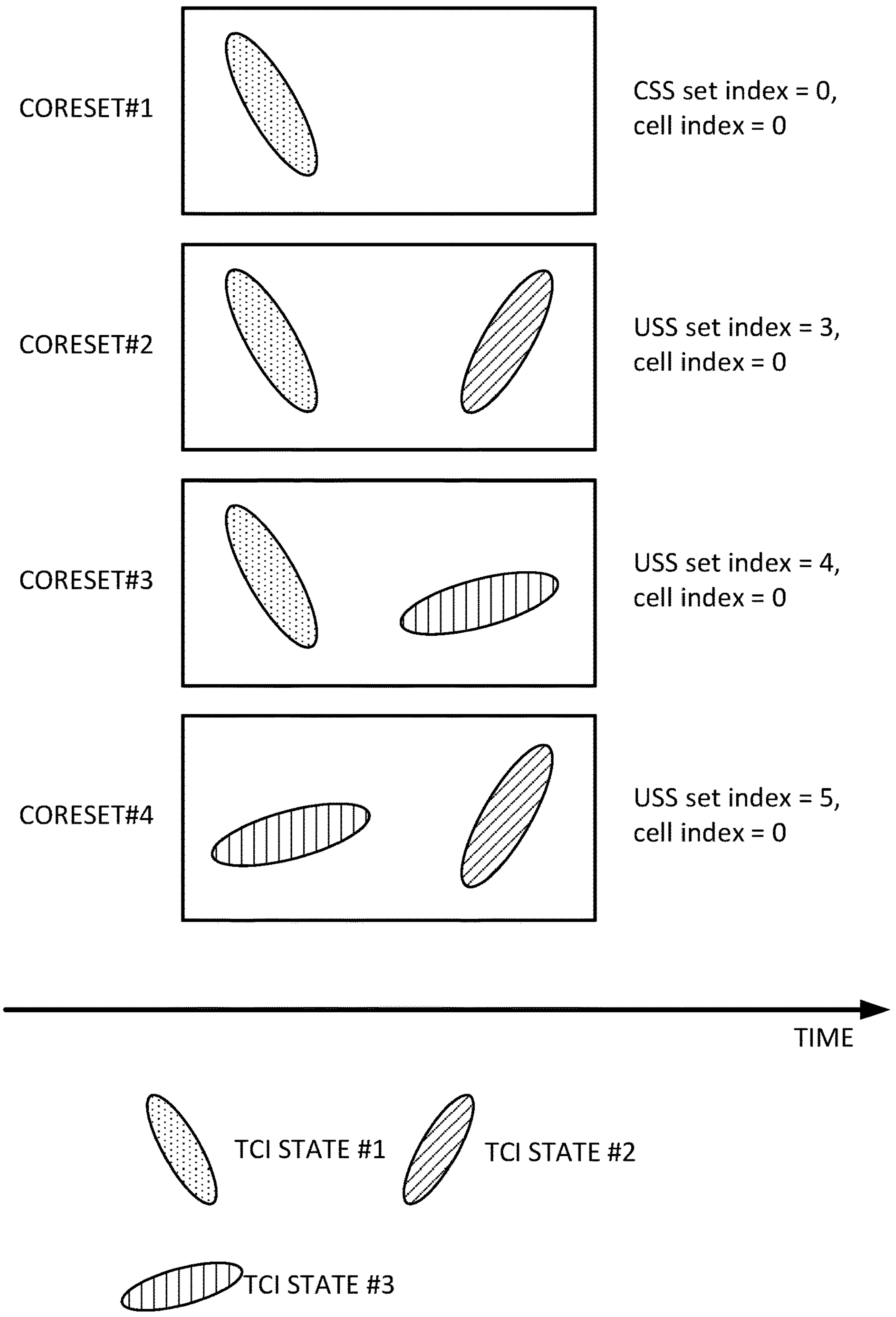
FIG. 7 is a diagram to show an example of the prioritized CORESET and such other CORESETs monitored simultaneously in Embodiment 1.1.2.

FIG. 7 is a diagram to show an example of a prioritized CORESET and other CORESETs monitored simultaneously in Embodiment 1.1.2. In the present example, four CORESETs (CORESETs #1 to #4) are overlapped in time.

CORESET #1 corresponds to CSS set index=0 and cell index=0 and has one active TCI state (TCI state #1).

CORESET #2 corresponds to USS set index=3 and cell index=0 and has two active TCI states (TCI states #1 and #2).

CORESET #3 corresponds to USS set index=4 and cell index=0 and has two active TCI states (TCI states #1 and #3).

CORESET #4 corresponds to USS set index=5 and cell index=0 and has two active TCI states (TCI states #3 and #2).

In the case in FIG. 7, the UE first selects CORESET #1 corresponding to a CSS set as a prioritized CORESET. CORESET #1 has one active TCI state and hence corresponds to the operation in Embodiment 1.1.2. This prioritized CORESET corresponds to the first prioritized CORESET, and TCI state #1 corresponds to the first priority TCI state.

The UE next searches for the second prioritized CORESET. CORESETs each having two active TCI states and also having one of the TCI states being the same as the first priority TCI state among remaining CORESETs #2 to #4 are CORESETs #2 and #3. The UE determines CORESET #2 having a smaller SS set index, as the second prioritized CORESET. The UE determines TCI state #2 different from the first priority TCI state of the TCI states of CORESET #2 as the second priority TCI state and applies TCI states #1 and #2 to monitor a PDCCH candidate in CORESET #2.

When the UE takes condition (1.1.2c) into account, the UE does not monitor CORESET #3. When the UE takes condition (1.1.2d) or (1.1.2e) into account, the UE applies only TCI state #1 to monitor CORESET #3.

When the UE takes condition (1.1.2c) or (1.1.2d) into account, the UE does not monitor CORESET #4. When the UE takes condition (1.1.2e) into account, the UE applies only TCI state #2 to monitor CORESET #4.

Embodiment 1.2

A priority rule Embodiment 1.2 is as follows:

step 1: if there is a subset of CORESETs each having two active TCI states among CORESETs to collide, apply the priority rule in Rel-16 NR only to the subset. If a prioritized CORESET is found, terminate the step. Otherwise, advance to step 2.

step 2: if no prioritized CORESET is found in step 1, apply the priority rule in Rel-16 NR only to the subset of CORESETs each having one active TCI state among the CORESETs to collide.

In other words, in Embodiment 1.2, the UE determines a prioritized CORESET according to a priority rule that a monitoring-target CORESET is determined at priorities in the order of CSS set having two active TCI states>USS set having two active TCI states>CSS set having one active TCI state>USS set having one active TCI state.

Note that, among SS sets of the same type (CSS or USS) having the same number of active TCI states, one with a lower index (specifically, with a lower cell index, and when the cell indices are the same, further with a lower SS set index) is selected as the prioritized CORESET.

A CORESET to be monitored may be determined from a CORESET(s) other than the prioritized CORESET as what has been described in Embodiment 1.1.1. In other words, a CORESET being other than the prioritized CORESET and having one active TCI state, when the one active TCI state is the same QCL type D as that of either of the two active TCI states of the prioritized CORESET, the UE may monitor this CORESET.

Moreover, for a CORESET being other than the prioritized CORESET and having two active TCI states, the UE may monitor this CORESET when condition (1.1.1a) or (1.1.1b) described above is satisfied.

Figure 8:
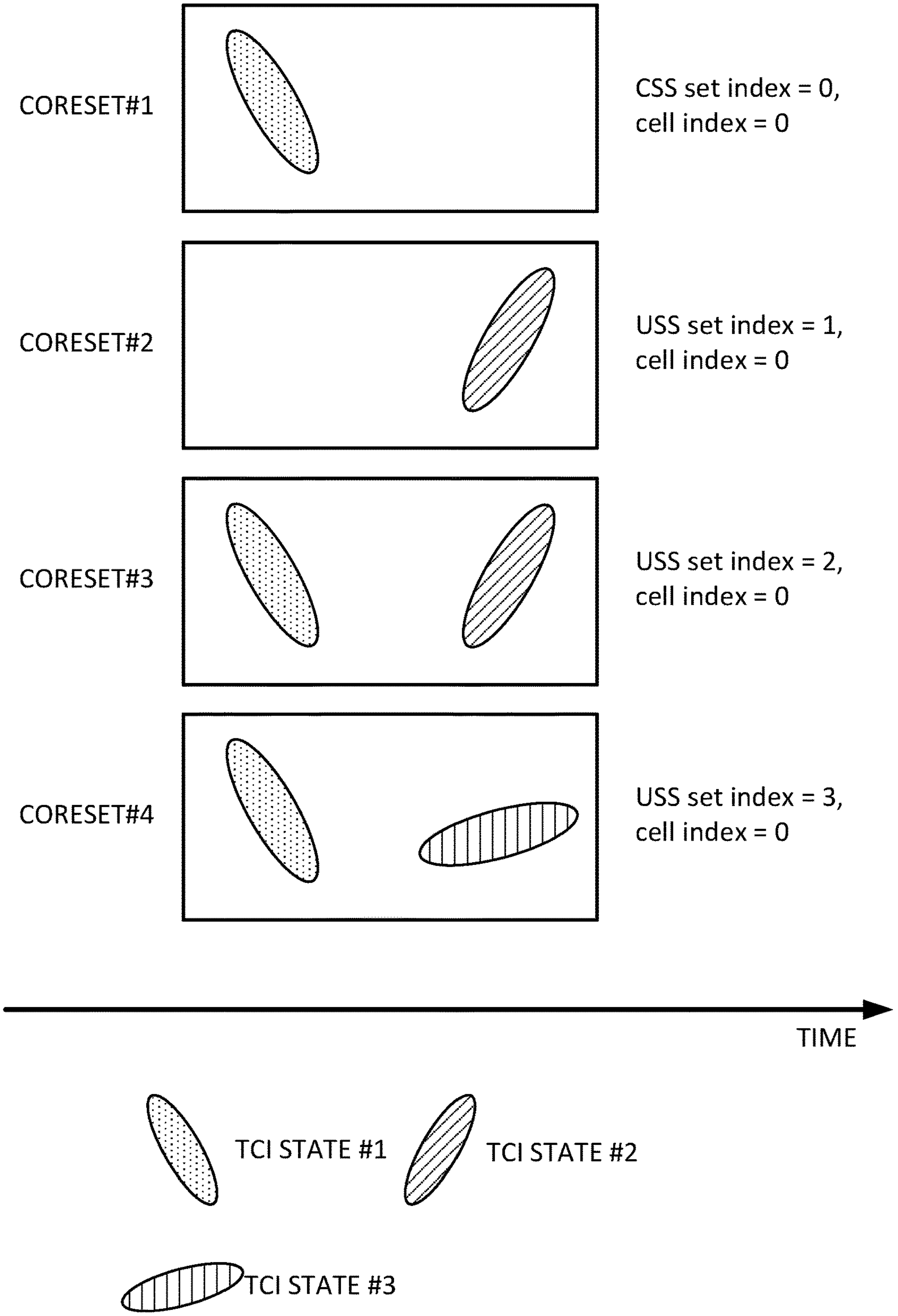
FIG. 8 is a diagram to show an example of a prioritized CORESET and other CORESETs monitored simultaneously in Embodiment 1.2.

FIG. 8 is a diagram to show an example of a prioritized CORESET and other CORESETs monitored simultaneously in Embodiment 1.2. In the present example, four CORESETs (CORESETs #1 to #4) are overlapped in time.

CORESET #1 corresponds to CSS set index=0 and cell index=0 and has one active TCI state (TCI state #1).

CORESET #2 corresponds to USS set index=1 and cell index=0 and has one active TCI state (TCI state #2).

CORESET #3 corresponds to USS set index=2 and cell index=0 and has two active TCI states (TCI states #1 and #2).

CORESET #4 corresponds to USS set index=3 and cell index=0 and has two active TCI states (TCI states #1 and #3).

In the case in FIG. 8, CORESETs each having two active TCI states are CORESETs #3 and #4, and CORESET #3 corresponding to a lower SS set index is selected as the prioritized CORESET.

The one TCI state of CORESET #1 has the same QCL type D as that of TCI state #1 of the prioritized CORESET, and hence the UE monitors CORESET #1.

The one TCI state of CORESET #2 has the same QCL type D as that of TCI state #2 of the prioritized CORESET, and hence the UE monitors CORESET #2.

One of the two TCI states of CORESET #4 has the same QCL type D as that of TCI state #1 of the prioritized CORESET, while the other has of a different QCL type D (TCI state #3) from that of TCI state #2 of the prioritized CORESET. Hence, the UE following (1.1.1a) above does not monitor CORESET #4. The UE following (1.1.1b) above applies only TCI state #1 to monitor CORESET #4.

Embodiment 1.3

A priority rule Embodiment 1.3 is as follows:

- step 1: when there is a CORESET having two active TCI states and corresponding to a CSS set with the lowest index in a cell with the lowest index including CSS sets among CORESETs to collide, determine this as a prioritized CORESET, and terminate this step. Otherwise, advance to step 2.
- step 2: when there is a CORESET having one active TCI state and corresponding to a CSS set with the lowest index in a cell with the lowest index including CSS sets among CORESETs to collide, determine this as a prioritized CORESET, and terminate this step. Otherwise, advance to step 3.
- step 3: when there is a CORESET having two active TCI states and corresponding to a USS set with the lowest index in a cell with the lowest index including USS sets among CORESETs to collide, determine this as a prioritized CORESET, and terminate this step. Otherwise, advance to step 4.
- step 4: when there is a CORESET having one active TCI state and corresponding to a USS set with the lowest index in a cell with the lowest index including USS sets among CORESETs to collide, determine this as a prioritized CORESET, and terminate this step.

In other words, in Embodiment 1.3, the UE determines a prioritized CORESET according to a priority rule that a monitoring-target CORESET is determined at priorities in the order of CSS set having two active TCI states>CSS set having one active TCI state>USS set having two active TCI states>USS set having one active TCI state.

Note that, among SS sets of the same type (CSS or USS) having the same number of active TCI states, one with a lower index (in other words, with a lower cell index, and when the cell indices are the same, further with a lower SS set index) is selected as the prioritized CORESET.

When a prioritized CORESET is determined in step 1 or 3 above, the UE may further determine a CORESET to monitor from a CORESET(s) other than the prioritized CORESET, based on Embodiment 1.1.1.

When a prioritized CORESET is determined in step 2 or 4 above, the UE may further determine a CORESET to monitor from a CORESET(s) other than the prioritized CORESET, based on Embodiment 1.1.2.

Note that a CORESET corresponding to a Type0-PDCCH CSS set (in other words, a CSS set for reception of system information) has 0 as an SS set index and hence used to always have the highest priority in the existing priority rule in Rel-15/16 NR. However, in the priority rule in Embodiment 1.3, a CORESET corresponding to a Type0-PDCCH CSS set having one TCI state corresponds to a priority lower than that of a CORESET corresponding to another CSS set having two TCI states.

According to the first embodiment described above, it is possible to appropriately determine a PDCCH to monitor, at the time of collision of a plurality of PDCCHs (CORESETs).

Second Embodiment

A second embodiment relates to an FDM PDCCH repetition scheme. Note that the second embodiment may be used for a non-SFN PDCCH repetition scheme without being limited to the FDM PDCCH repetition scheme.

In the second embodiment, two SS sets having a plurality of corresponding CORESETs may be used for PDCCH repetition. Associations between the two SS sets and the plurality of CORESETs may be defined in advance in a specification or may be configured for the UE by higher layer signaling (for example, RRC signaling).

In the second embodiment, in a case where a plurality of PDCCHs of different QCL types D collide, the UE determines a prioritized CORESET, based on at least one priority rule to be described in Embodiments 2.1 to 2.3. The individual embodiments will be described below.

Note that an association between a certain CORESET (for example, a prioritized CORESET) and another CORESET may be defined in advance in a specification or may be configured for the UE by higher layer signaling (for example, RRC signaling). What are associated with each other need not be limited to CORESETs, and a CORESET and an SS set may be associated, or SS sets may be associated with each other.

In the second embodiment, a prioritized CORESET and "prioritized CORESET/SS set corresponding to a prioritized CORESET," may be interchangeably interpreted. In the second embodiment, another CORESET and "another CORESET/SS set corresponding to another CORESET," may be interchangeably interpreted.

An "association" in the second embodiment may be referred to as an association for collision control for a plurality of PDCCHS, an association for CORESET selection for PDCCH monitoring, an association related to prioritizing of a CORESET, or the like.

Embodiment 2.1

A priority rule of Embodiment 2.1 is the same as that in Rel-16 NR. In other words, the UE determines a prioritized CORESET according to a priority rule that a CSS set is monitored at a higher priority than that of a USS set, and, among SS sets of the same type (CSS or USS), one with a lower index (in other words, with a lower cell index, and when the cell indices are the same, further with a lower SS set index) is monitored at a higher priority Embodiment 2.1 can be further broadly classified into two:

Embodiment 2.1.1: a prioritized CORESET is associated with another CORESET and

Embodiment 2.1.2: a prioritized CORESET is not associated with another CORESET and Embodiment 2.1.1

The UE may monitor another CORESET related to a prioritized CORESET simultaneously with the prioritized CORESET.

In Embodiment 2.1.1, a TCI state of the prioritized CORESET may be referred to as a first priority TCI state (1st priority TCI state). A TCI state of such another CORESET may be referred to as a second priority TCI state (2nd priority TCI state).

For each remaining CORESET excluding a prioritized CORESET and such another CORESET above, the UE may monitor this CORESET when condition (2.1.1a) or (2.1.1b) below is satisfied:

(2.1.1a) the TCI state has the same QCL type D as that of the first priority TCI state and (2.1.1b) the TCI state has the same QCL type D as that of the first priority TCI state or the second priority TCI state.

Figure 9:
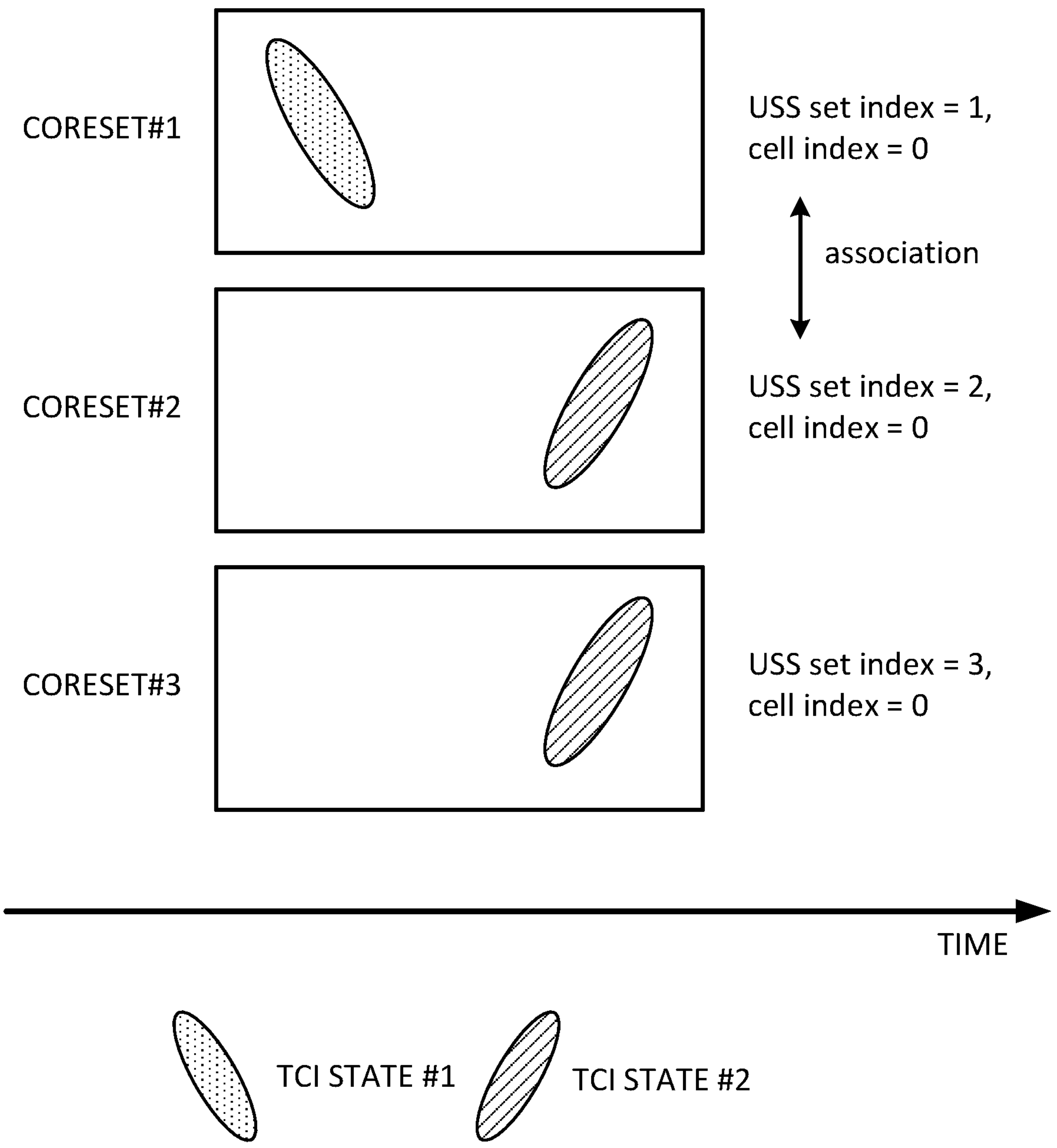
FIG. 9 is a diagram to show an example of a prioritized CORESET and other CORESETs monitored simultaneously in Embodiment 2.1.1.

FIG. 9 is a diagram to show an example of a prioritized CORESET and other CORESETs monitored simultaneously in Embodiment 2.1.1. In the present example, three CORESETs (CORESETs #1 to #3) are overlapped in time.

CORESET #1 corresponds to USS set index=1 and cell index=0 and has one active TCI state (TCI state #1).

CORESET #2 corresponds to USS set index=2 and cell index=0 and has one active TCI state (TCI state #2).

CORESET #3 corresponds to USS set index=3 and cell index=0 and has one active TCI state (TCI state #2).

CORESETs #1 and #2 are associated with each other.

In the case in FIG. 9, the UE first selects CORESET #1 corresponding to a USS set with the lowest USS set index as a prioritized CORESET. CORESET #1 has another associated CORESET (CORESET #2) and hence corresponds to operation in Embodiment 2.1.1.

CORESET #2 is associated with the prioritized CORESET, and hence the UE monitors CORESET #2. The US determines the active TCI state of CORESET #2 as a second priority TCI state.

CORESET #3 is not associated with the prioritized CORESET, but the active TCI state of CORESET #3 has the same QCL type D as that of the second priority TCI state. Hence, the UE following (2.1.1a) above does not monitor CORESET #3. The UE following (2.1.1b) above monitors CORESET #3.

Embodiment 2.1.2

For Embodiment 2.1.2, a prioritized CORESET determined first according to the same priority rule as that in Rel-16 NR is also referred to as a first prioritized CORESET, and a prioritized CORESET that is determined next and is other than the first prioritized CORESET is also referred to as a second prioritized CORESET. The second prioritized CORESET may be referred to as a CORESET X.

The active TCI state of the first prioritized CORESET may be referred to as a first priority TCI state (1st priority TCI state). The active TCI state of the second prioritized CORESET may be referred to as a second priority TCI state (2nd priority TCI state).

Embodiment 2.1.2 is broadly divided into Embodiments 2.1.2.1 and 2.1.2.2 depending on the method of determining a second prioritized CORESET.

Embodiment 2.1.2.1

The second prioritized CORESET may be determined from among remaining CORESETs to collide excluding the first prioritized CORESET, according to a similar priority rule to that in Rel. 16. In other words, the second prioritized CORESET may correspond, if any, to a CSS set with the lowest index in a cell with the lowest index including CSS sets among the remaining CORESETs to collide, and otherwise, to a USS set with the lowest index in a cell with the lowest index. The lowest USS set index is determined over all the USS sets including at least one PDCCH candidate in overlapped PDCCH monitoring occasions.

When the active TCI state of a candidate for the second prioritized CORESET derived according to the above priority rule is the same as the first priority TCI state, the next candidate (CORESET corresponding to the SS set/cell of the next lowest index) may be used as a candidate for the second prioritized CORESET for searching. In other words, the UE may continue searching for the second prioritized CORESET until the active TCI state turns to be one different from the first priority TCI state.

When a CORESET having only one active TCI state different from the first priority TCI state is found according to the priority rule, the UE may determine this active TCI state as the second priority TCI state and determine this CORESET as the second prioritized CORESET.

Note that, even when the active TCI state of a candidate for the second prioritized CORESET derived according to the above priority rule is the same as the first priority TCI state, the UE may determine this active TCI state as the second priority TCI state and determine this candidate as the second prioritized CORESET. In this case, since the second prioritized CORESET is the same as the first prioritized CORESET, this may be expressed as no second prioritized CORESET.

Figure 10:
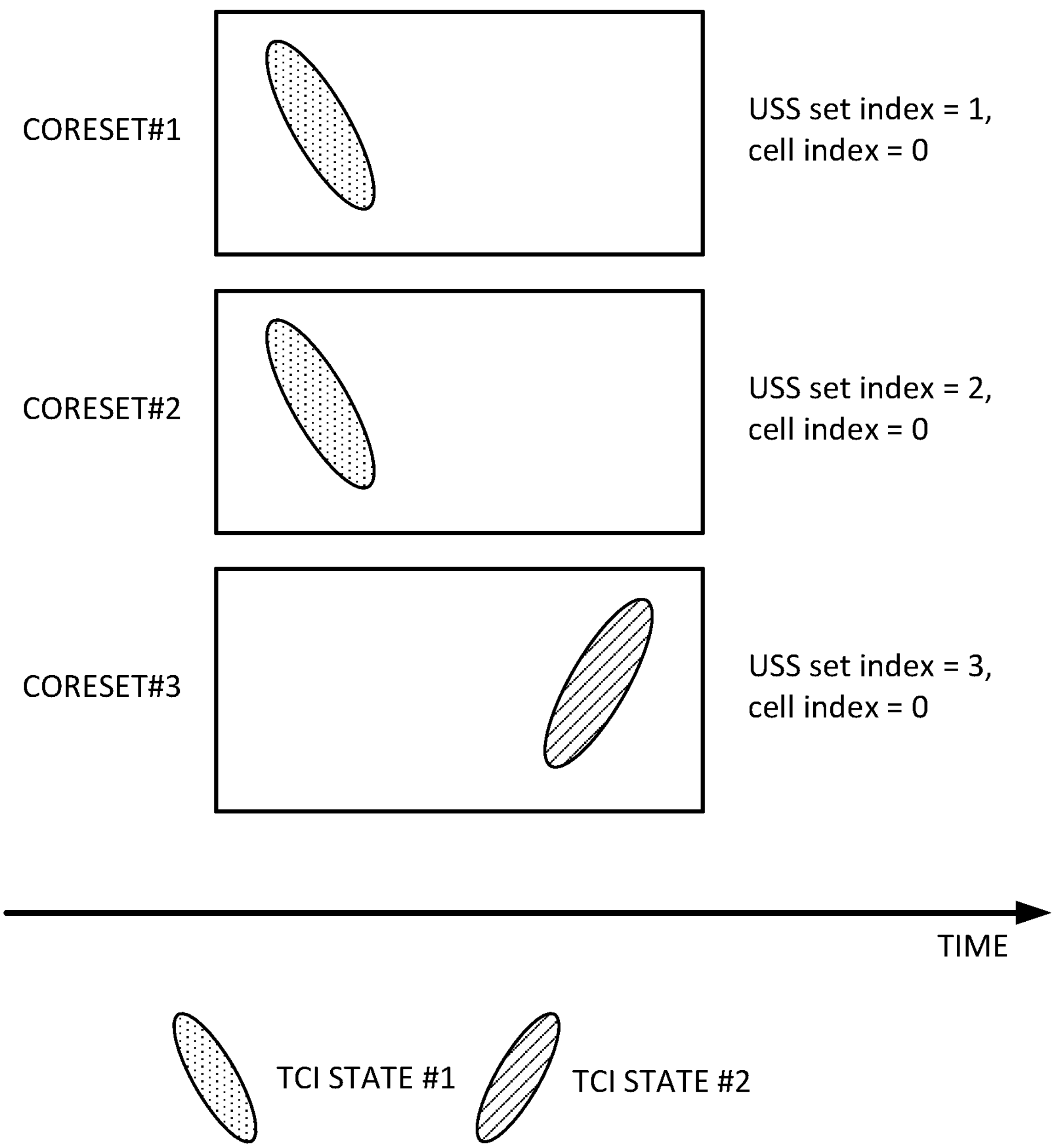
FIG. 10 is a diagram to show an example of a prioritized CORESET in Embodiment 2.1.2.1.

FIG. 10 is a diagram to show an example of a prioritized CORESET in Embodiment 2.1.2.1. In the present example, three CORESETS (CORESETs #1 to #3) are overlapped in time.

CORESET #1 corresponds to USS set index=1 and cell index=0 and has one active TCI state (TCI state #1).

CORESET #2 corresponds to USS set index=2 and cell index=0 and has one active TCI state (TCI state #1).

CORESET #3 corresponds to USS set index=3 and cell index=0 and has one active TCI state (TCI state #2).

In the case in FIG. 10, the UE first selects CORESET #1 corresponding to a USS set with the lowest USS set index as a prioritized CORESET. CORESET #1 does not have another associated CORESET and hence corresponds to operation in Embodiment 2.1.2. This prioritized CORESET corresponds to the first prioritized CORESET, and TCI state #1 corresponds to the first priority TCI state.

The UE next searches for the second prioritized CORESET. The TCI state (TCI state #2) of CORESET #3 is different from TCI state #1 of the prioritized CORESET, and hence the UE determines TCI state #2 as the second priority TCI state and determines CORESET #3 as the second prioritized CORESET, for monitoring.

Embodiment 2.1.2.2

The UE first determines a subset of CORESETs each associated with another CORESET and also having a TCI state being the same as the first priority TCI state, from among the remaining CORESETs to collide excluding the first prioritized CORESET.

The UE may then determine the second prioritized CORESET from the subset according to a similar priority rule to that of Rel. 16. In other words, the second prioritized CORESET may correspond, if any, to a CSS set with the lowest index in a cell with the lowest index including CSS sets among the CORESETS included in the subset, and otherwise, to a USS set with the lowest index in a cell with the lowest index. The lowest USS set index is determined over all the USS sets including at least one PDCCH candidate in overlapped PDCCH monitoring occasions.

The second priority TCI state may correspond to the active TCI state of another CORESET associated with the second prioritized CORESET.

Note that the second prioritized CORESET may be, if any, a CORESET associated with a CORESET corresponding to a CSS set with the lowest index in a cell with the lowest index including CSS sets among the CORESETs included in the subset, and otherwise, may be a CORESET associated with a CORESET corresponding to a USS set with the lowest index in the cell with the lowest index. In this case, the second priority TCI state may correspond to the active TCI state of the second prioritized CORESET.

Figure 11:
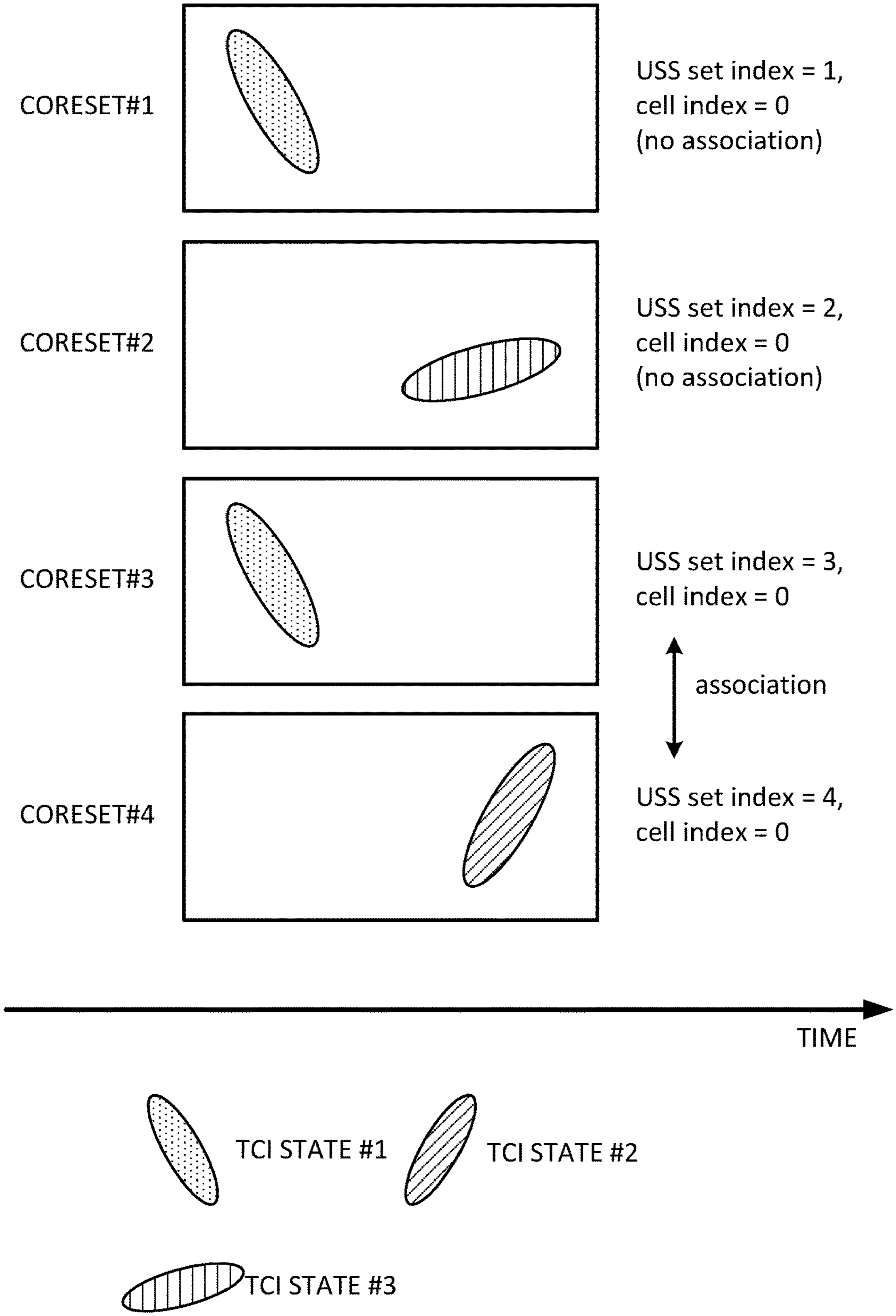
FIG. 11 is a diagram to show an example of a prioritized CORESET in Embodiment 2.1.2.2.

FIG. 11 is a diagram to show an example of a prioritized CORESET in Embodiment 2.1.2.2. In the present example, four CORESETS (CORESETs #1 to #4) are overlapped in time.

CORESET #1 corresponds to USS set index=1 and cell index=0 and has one active TCI state (TCI state #1).

CORESET #2 corresponds to USS set index=2 and cell index=0 and has one active TCI state (TCI state #3).

CORESET #3 corresponds to USS set index=3 and cell index=0 and has one active TCI state (TCI state #1).

CORESET #4 corresponds to USS set index=4 and cell index=0 and has one active TCI state (TCI state #2).

CORESET #1 is not associated with any other CORESET. CORESET #2 is not associated with any other CORESET. CORESETs #3 and #4 are associated with each other.

In the case in FIG. 11, the UE first selects CORESET #1 corresponding to a USS set with the lowest USS set index as a prioritized CORESET. CORESET #1 does not have another associated CORESET and hence corresponds to the operation in Embodiment 2.1.2. This prioritized CORESET corresponds to the first prioritized CORESET, and TCI state #1 corresponds to the first priority TCI state.

The UE next searches for the second prioritized CORESET. A CORESET having another associated CORESET and also having a TCI state being the same as the first priority TCI state among remaining CORESETs #2 to #4 is CORESET #3 only. Hence, the UE determines CORESET #3 as the second prioritized CORESET and determines TCI state #2 of CORESET #4 associated with CORESET #3 as the second priority TCI state. The UE monitors PDCCH candidates in CORESETs #3 and #4.

{{CORESET(s) Other than Prioritized CORESETs}}

Monitoring of a CORESET(s) other than the prioritized CORESETs (first prioritized CORESET and second prioritized CORESET) and CORESETs associated with the prioritized CORESETs in Embodiment 2.1.2 will be described.

For the CORESET(s), the UE may monitor this CORESET when condition (2.1.2a) or (2.1.2b) below is satisfied:

(2.1.2a) the TCI state has the same QCL type D as that of the first priority TCI state and (2.1.2b) the TCI state has the same QCL type D as that of the first priority TCI state or the second priority TCI state.

Figure 12:
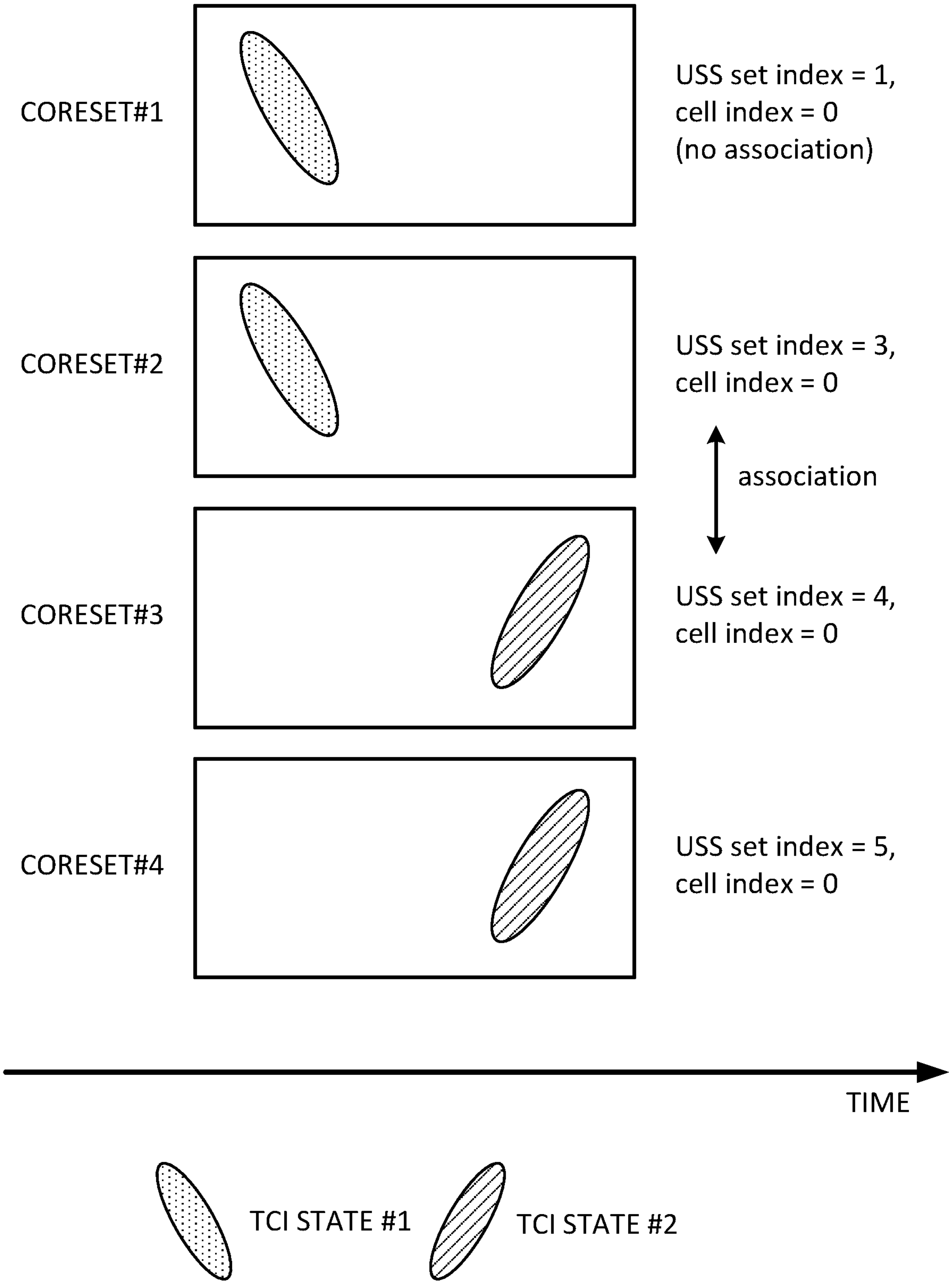
FIG. 12 is a diagram to show an example of a prioritized CORESET and other CORESETs monitored simultaneously in Embodiment 2.1.2.

FIG. 12 is a diagram to show an example of a prioritized CORESET and other CORESETs monitored simultaneously in Embodiment 2.1.2. In the present example, four CORESETs (CORESETs #1 to #4) are overlapped in time.

CORESET #1 corresponds to USS set index=1 and cell index=0 and has one active TCI state (TCI state #1).

CORESET #2 corresponds to USS set index=3 and cell index=0 and has one active TCI state (TCI state #1).

CORESET #3 corresponds to USS set index=4 and cell index=0 and has one active TCI state (TCI state #2).

CORESET #4 corresponds to USS set index=5 and cell index=0 and has one active TCI state (TCI state #2).

CORESET #1 is not associated with any other CORESET. CORESETs #2 and #3 are associated with each other.

In the case in FIG. 12, the UE first selects CORESET #1 corresponding to a USS set with the lowest USS set index as a prioritized CORESET. CORESET #1 does not have another associated CORESET and hence corresponds to the operation in Embodiment 2.1.2. This prioritized CORESET corresponds to the first prioritized CORESET, and TCI state #1 corresponds to the first priority TCI state.

The UE next searches for the second prioritized CORESET. A CORESET having another associated CORESET and also having a TCI state being the same as the first priority TCI state among remaining CORESETs #2 to #4 is CORESET #2 only. Hence, the UE determines CORESET #2 as the second prioritized CORESET and determines TCI state #2 of CORESET #3 associated with CORESET #2 as the second priority TCI state. The UE monitors PDCCH candidates in CORESETs #2 and #3.

When the UE takes condition (2.1.2a) into account, the UE does not monitor CORESET #4. When the UE takes condition (2.1.2b) into account, the UE monitors CORESET #4.

Embodiment 2.2

A priority rule Embodiment 2.2 is as follows:

step 1: if there is a subset of CORESETs each associated with another CORESET (in other words, having an association with another CORESET) among CORESETs to collide, apply the priority rule in Rel-16 NR only to these. If a prioritized CORESET is found, terminate the step. Otherwise, advance to step 2.

step 2: if no prioritized CORESET is found in step 1, apply the priority rule in Rel-16 NR only to the subset of CORESETs each not having an association with another CORESET among the CORESETs to collide.

In other words, in Embodiment 2.2, the UE determines a prioritized CORESET according to a priority rule that a monitoring-target CORESET is determined at priorities in the order of CSS set having an association with another CORESET (also referred to simply as an "association" in the present disclosure)>USS set having an association>CSS set having no association>USS set having no association.

Note that, among SS sets of the same type (CSS or USS) having an association (or having no association), one with a lower index (in other words, with a lower cell index, and when the cell indices are the same, further with a lower SS set index) is selected as the prioritized CORESET.

Figure 13:
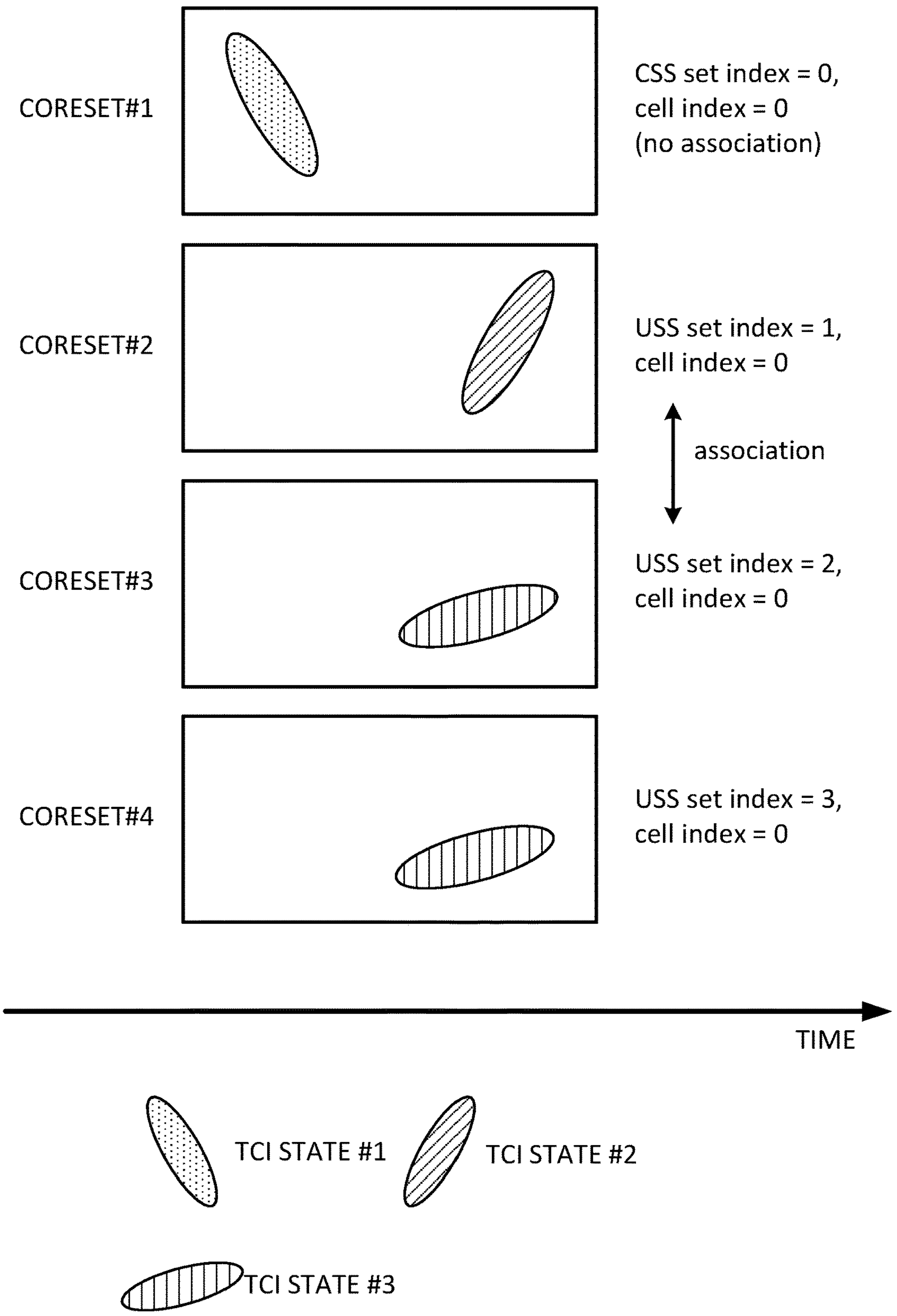
FIG. 13 is a diagram to show an example of a prioritized CORESET and other CORESETs monitored simultaneously in Embodiment 2.2.

A CORESET to be monitored may be determined from a CORESET(s) other than the prioritized CORESET as what has been described in Embodiment 2.1.1. In other words, for each remaining CORESET excluding a prioritized CORESET and another CORESET associated with the prioritized CORESET, the UE may monitor this CORESET when condition (2.1.1a) or (2.1.1b) below is satisfied:

FIG. 13 is a diagram to show an example of a prioritized CORESET and other CORESETs monitored simultaneously in Embodiment 2.2. In the present example, four CORESETs (CORESETs #1 to #4) are overlapped in time.

CORESET #1 corresponds to CSS set index=0 and cell index=0 and has one active TCI state (TCI state #1).

CORESET #2 corresponds to USS set index=1 and cell index=0 and has one active TCI state (TCI state #2).

CORESET #3 corresponds to USS set index=2 and cell index=0 and has one active TCI state (TCI state #3).

CORESET #4 corresponds to USS set index=3 and cell index=0 and has one active TCI state (TCI state #3).

CORESET #1 is not associated with any other CORESET. CORESETs #2 and #3 are associated with each other.

In the case in FIG. 13, CORESETs each associated with another CORESET are CORESETs #2 and #3, and CORESET #2 corresponding to a lower SS set index is selected as the prioritized CORESET. TCI state #2 of CORESET #2 corresponds to the first priority TCI state.

TCI state #3 of CORESET #3 associated with the prioritized CORESET is determined as a second priority TCI state. The UE monitors PDCCH candidates in CORESETs #2 and #3.

The TCI state of CORESET #1 is neither the first priority TCI state nor the second TCI state, and hence the UE does not monitor CORESET #1. The UE following (2.1.1a) above does not monitor CORESET #4. The UE following (2.1.1b) above monitors CORESET #4.

Embodiment 2.3

A priority rule Embodiment 2.3 is as follows:

step 1: when there is a CORESET having an association and corresponding to a CSS set with the lowest index in a cell with the lowest index including CSS sets among CORESETs to collide, determine this as the prioritized CORESET, and terminate this step. Otherwise, advance to step 2.

step 2: when there is a CORESET not having an association and corresponding to a CSS set with the lowest index in a cell with the lowest index including CSS sets among CORESETs to collide, determine this as the prioritized CORESET, and terminate this step. Otherwise, advance to step 3.

step 3: when there is a CORESET having an association and corresponding to a USS set with the lowest index in a cell with the lowest index including USS sets among CORESETs to collide, determine this as the prioritized CORESET, and terminate this step. Otherwise, advance to step 4.

step 4: when there is a CORESET not having an association and corresponding to a USS set with the lowest index in a cell with the lowest index including USS sets among CORESETs to collide, determine this as the prioritized CORESET, and terminate this step.

In other words, in Embodiment 2.3, the UE determines a prioritized CORESET according to a priority rule that a monitoring-target CORESET is determined at priorities in the order of CSS set having an association>CSS set not having an association>USS set having an association>USS set having no association.

Note that, among SS sets of the same type (CSS or USS) having an association (or having no association), one with a lower index (specifically, with a lower cell index, and when the cell indices are the same, further with a lower SS set index) is selected as the prioritized CORESET.

When a prioritized CORESET is determined in step 1 or 3 above, the UE may further determine a CORESET to monitor from a CORESET(s) other than the prioritized CORESET, based on Embodiment 2.1.1.

When a prioritized CORESET is determined in step 2 or 4 above, the UE may further determine a CORESET to monitor from a CORESET(s) other than the prioritized CORESET, based on Embodiment 2.1.2.

Note that a CORESET corresponding to a Type0-PDCCH CSS set (in other words, a CSS set for reception of system information) has 0 as an SS set index and hence used to always have the highest priority in the existing priority rule in Rel-15/16 NR. However, in the priority rule in Embodiment 1.3, a CORESET corresponding to a Type0-PDCCH CSS set having one TCI state corresponds to a priority lower than that of a CORESET corresponding to another CSS set having two TCI states.

According to the second embodiment described above, it is possible to appropriately determine a PDCCH to monitor, at the time of collision of a plurality of PDCCHs (CORESETs).

Third Embodiment

{Variations of SFN-PDCCH}

For the first embodiment (SFN-PDCCH), only one CORESET may always be selected. In other words, a second prioritized CORESET need not be selected as in Embodiment 1.1.2.

For the first embodiment, when one selected CORESET (prioritized CORESET) has two TCI states, the UE may monitor a PDCCH candidate(s) in one or more CORESETs by using both of the two TCI states.

For the first embodiment, when the one selected CORESET (prioritized CORESET) has only one TCI state, the UE may monitor a PDCCH candidate(s) in one or more CORESETs by using the one TCI state. In this case, the one or more CORESETs may be declined to be used as an SFN-CORESET(s) (CORESET(s) for SFN).

{Variations of Selection of Prioritized CORESET}

In Embodiment 1.1 and Embodiment 2.1, the descriptions have been given by assuming that a prioritized CORESET is selected from among all the overlapped CORESETs. However, this is not restrictive. The prioritized CORESET may be selected from a CORESET(s) (for example, an SFN-CORESET(s)) having two TCI states among all the overlapped CORESETs (in other words, by prioritizing a CORESET(s) having two TCI states), based on the above-described priority rule.

{Variations of Monitoring of CORESET(s) Other than Prioritized CORESET(s)}

In any of the above-described embodiments, a (first/second) prioritized CORESET is selected. When the prioritized CORESET has two TCI states, all the CORESETs each having any or both of the two TCI states may be monitored by the UE. When the prioritized CORESET has only one TCI state, all the CORESETs each having at least the one TCI state may be monitored by the UE, or all the CORESETs each having only the one TCI state may be monitored by the UE.

Figure 14:
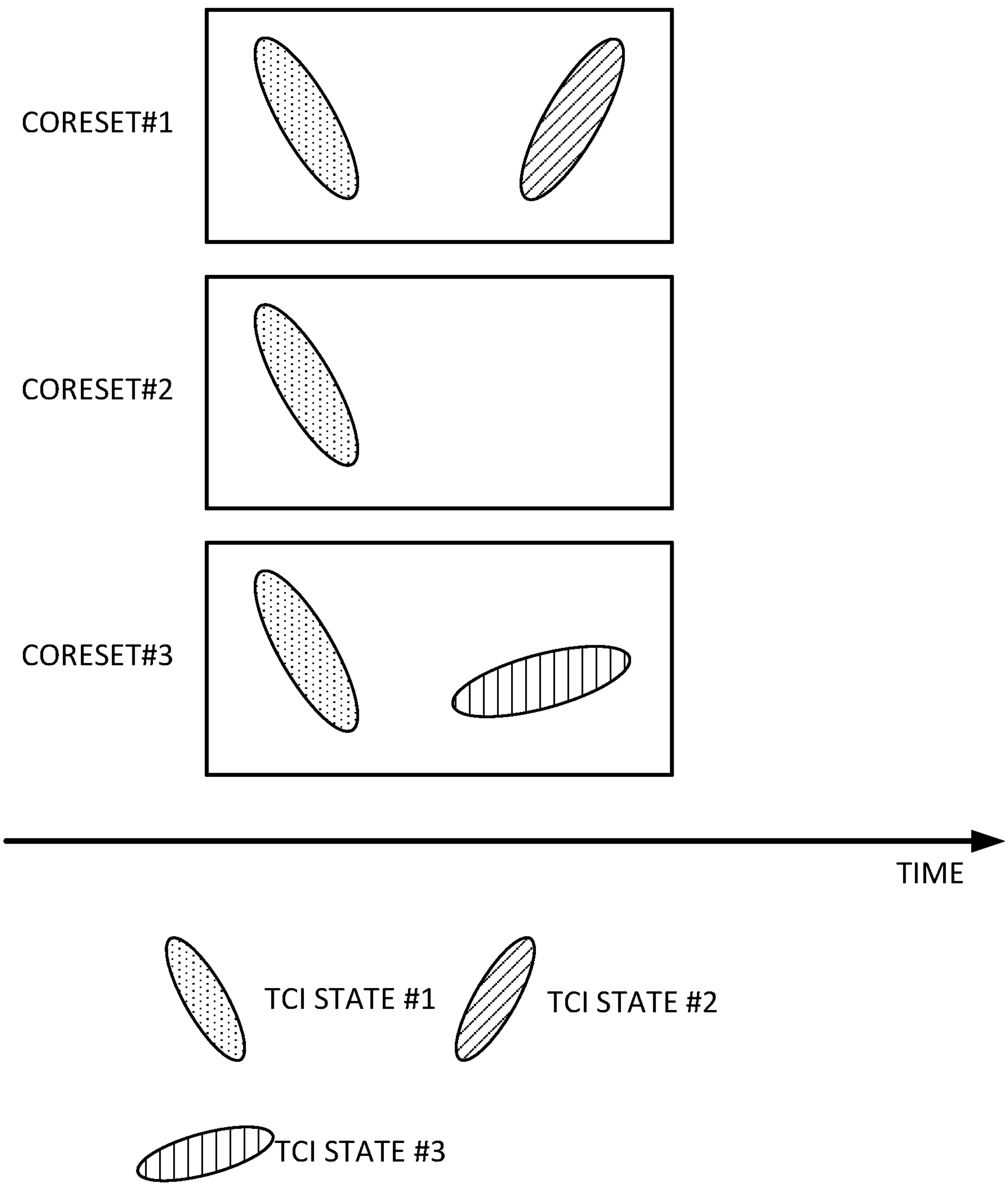
FIG. 14 is a diagram to show an example of a prioritized CORESET with two TCI states and other CORESETs monitored simultaneously.

FIG. 14 is a diagram to show an example of a prioritized CORESET with two TCI states and other CORESETs monitored simultaneously. In the present example, three CORESETs (CORESETS #1 to #3) are overlapped in time.

CORESET #1 has two active TCI states (TCI states #1 and #2). CORESET #2 has one active TCI state (TCI state #1). CORESET #3 has two active TCI states (TCI states #1 and #3).

For FIG. 14, consider a case where the UE selects CORESET #1 as a prioritized CORESET. The UE monitors a PDCCH candidate in CORESET #1.

CORESET #2 has only one (TCI state #1) of the TCI states of the prioritized CORESET. When all the CORESETs each having either of the two TCI states of the prioritized CORESET are monitored, the UE may monitor CORESET #2 together with CORESET #1 by using TCI state #1. When all the CORESETs each having both of the two TCI states of the prioritized CORESET are monitored, the UE need not monitor CORESET #2 together with CORESET #1.

CORESET #3 has one (TCI state #1) of the TCI states of the prioritized CORESET and a TCI state (TCI state #3) different from those of the prioritized CORESET. When all the CORESETs each having either of the two TCI states of the prioritized CORESET are monitored, the UE may monitor CORESET #3 together with CORESET #1 by using TCI state #1. When all the CORESETs each having both of the two TCI states of the prioritized CORESET are monitored, the UE need not monitor CORESET #3 together with CORESET #1.

Note that, when the prioritized CORESET has two TCI states, any other CORESET overlapped in time may be monitored by the UE by using either or both of the two TCI states. For example, in the case of FIG. 14, the UE may monitor a PDCCH candidate(s) in at least one of CORESETs #2 and #3 by using either or both of TCI states #1 and #2 (by force).

Figure 15:
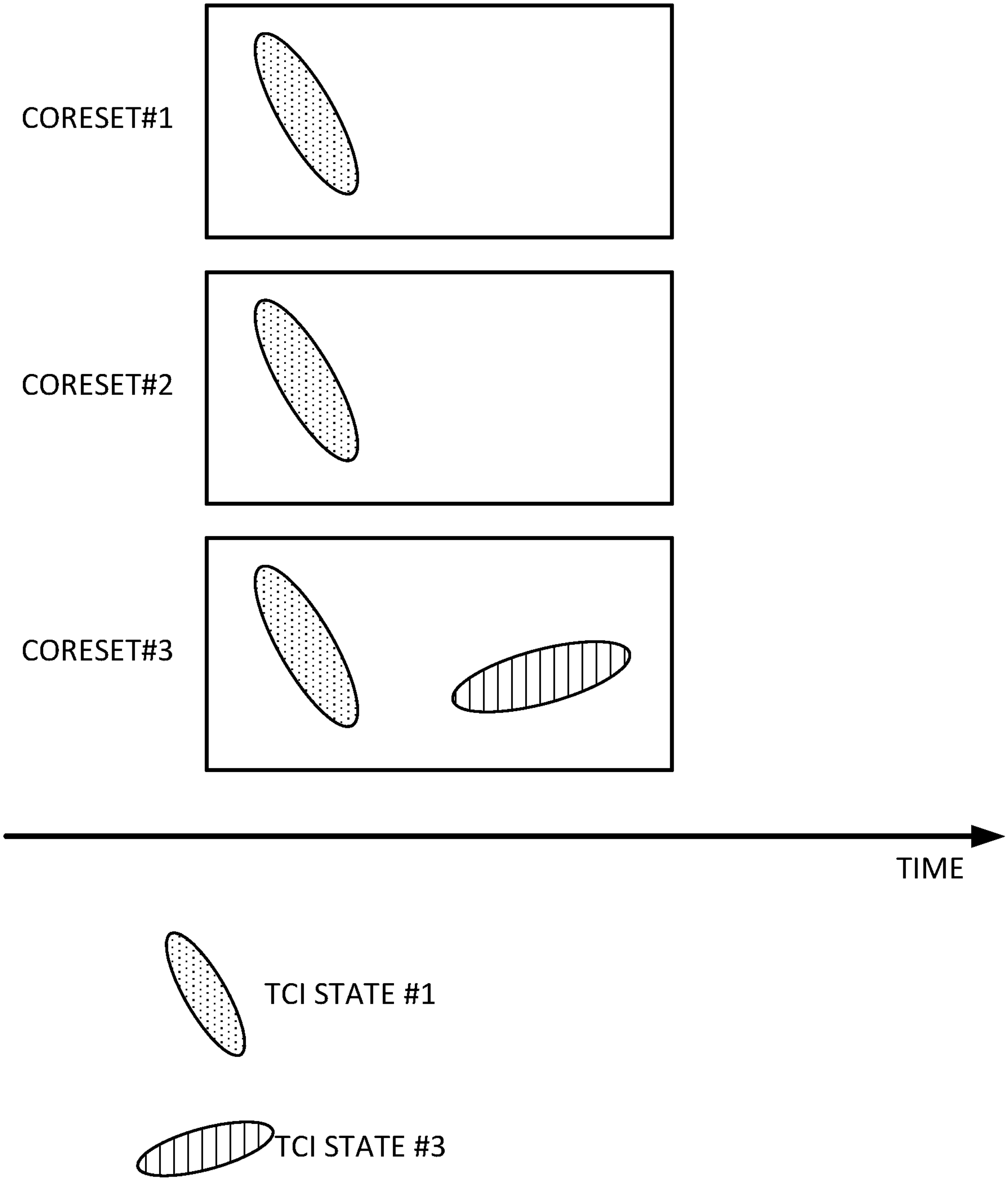
FIG. 15 is a diagram to show an example of a prioritized CORESET with only one TCI state and other CORESETs monitored simultaneously.

FIG. 15 is a diagram to show an example of a prioritized CORESET with only one TCI state and other CORESETs monitored simultaneously. In the present example, three CORESETs (CORESETS #1 to #3) are overlapped in time.

CORESET #1 has one active TCI state (TCI state #1). CORESET #2 has one active TCI state (TCI state #1). CORESET #3 has two active TCI states (TCI states #1 and #3).

For FIG. 15, consider a case where the UE selects CORESET #1 as a prioritized CORESET. The UE monitors a PDCCH candidate in CORESET #1.

CORESET #2 has TCI state #1, which is the same as the TCI state of the prioritized CORESET. The UE may monitor CORESET #2 together with CORESET #1 by using TCI state #1.

CORESET #3 has TCI state #1 of the prioritized CORESET and TCI state (TCI state #3) different from those of the prioritized CORESET. When all the CORESETs each having at least one TCI state of the prioritized CORESET are monitored, the UE may monitor CORESET #3 together with CORESET #1 by using TCI state #1. When all the CORESETs each having only one TCI state of the prioritized CORESET are monitored, the UE need not monitor CORESET #3 together with CORESET #1.

Note that, when the prioritized CORESET has one TCI state, any other CORESET overlapped in time may be monitored by the UE by using the one TCI state. For example, in the case of FIG. 15, the UE may monitor a PDCCH candidate(s) in at least one of CORESETs #2 and #3 by (forcibly) using TCI state #1.

{Priority Rules for SFN-PDCCH and PDCCH Repetition}

For SEN-PDCCH, since it is preferable that a CORESET having two TCI states has a higher priority than that of a CORESET having one TCI state, it is suitable to adopt Embodiment 1.2 or 1.3. Embodiment 1.3 uses the same rule as the Rel-15/16 priority rule in that a CSS always has a higher priority than that of a USS and may hence be more preferable than Embodiment 1.2.

The same rule (or similar rules) may be adopted, or different rules may be adopted, for a priority rule for SFN-PDCCH (SFN-CORESET) (first embodiment) and a priority rule for PDCCH repetition (second embodiment). In other words, the UE may determine a prioritized CORESET, based on the same priority rule, or may determine a prioritized CORESET, based on different rules, for SFN-PDCCH and PDCCH repetition.

For example, when Embodiment 1.3 and Embodiment 2.3 are adopted, the priority rules for SFN-PDCCH and PDCCH repetition are the same. In this case, reduction of the processing load on the UE can be expected. In particular, in a case where both SFN-PDCCH and PDCCH repetition are configured within one BWP/CC/band/frequency range/UE, a common priority rule is preferably adopted.

Each of information related to a priority rule for SFN-PDCCH (SFN-CORESET) (for example, information indicating a priority rule to be applied), information related to a priority rule for PDCCH repetition (for example, information indicating a priority rule to be applied), and the like may be configured for the UE or determined based on UE capability by using any of or a combination of physical layer signaling (for example, downlink control information (DCI)), higher layer signaling (for example, RRC signaling, a MAC CE), and a specific signal/channel. Note that, when these priority rules are in common, one piece of information may be configured for the UE/determined by the UE.

Note that, for a UE that supports reception of two different beams and configured with PDCCH repetition, determination of two QCL-D properties for overlapped CORESETs may be made from the following options:

- option 1: two QCL-D properties are identified based on an existing priority order (Rel-15/16 priority rule),
- option 2: a first QCL-D property is determined based on an existing Rel-15/16 priority rule, and then a second QCL-D is identified according to one of one or more SS sets linked to SS sets each having the first QCL-D (from among a plurality of overlapped CORESETs), where the second QCL-D may be determined according to a Rel-15/16 priority order for a plurality of such SS set pairs, and
- option 3: the same priority is assigned for two linked SS sets for PDCCH transmission in overlapped monitoring occasions. The priority may be based on the one having a lower SS set ID of the two linked SS sets.

The priority order may be the order that SS type (USS/CSS)>linkage of SS sets (a linked SS set has a higher priority than that of an individual SS set (without link))>cell index>associated SS set ID.

Option 1 may correspond to Embodiment 2.1.1, Embodiment 2.1.2.1, and the like. Option 2 may correspond to Embodiment 2.1.2.2. Option 3 may correspond to Embodiment 2.3.

Note that the UE may assume, but need not assume, that both of PDCCH repetition and SFN-CORESET are configured for respective different CORESETs, within one BWP/CC/band/UE.

When the UE is configured with both of PDCCH repetition and SFN-CORESET (both occur) at the same symbol(s) (PDCCH monitoring occasions overlapped in time), PDCCH QCL-D collision handling for these may follow the priority rule for PDCCH repetition (for example, any of the priority rules described in the second embodiment) or may follow the priority rule for SFN-CORESET (for example, any of the priority rules described in the first embodiment).

The UE may assume that the configured/determined priority rule for PDCCH repetition and the configured/determined priority rule for SFN-CORESET may be the same (in common). In this case, irrespective of which rule to follow, the PDCCH QCL-D collision handling is based on the same priority rule for the PDCCH repetition and the SFN-CORESET at the same symbol(s).

Note that the UE may perform PDCCH QCL-D collision handling on each of the symbol(s) where both PDCCH repetition and SFN-CORESET are present (which may include any other CORESET than these) and the symbol(s) where one of PDCCH repetition and SFN-CORESET is present (which may include any other CORESET than these), according to a different priority rule.

<Others>

Note that at least one of the above-described embodiments may be applied only to a UE that has reported a specific UE capability or that supports the specific UE capability.

The specific UE capability may indicate at least one of the following:

- whether to support an SFN PDCCH repetition scheme (or SFN-PDCCH or SFN-CORESET),
- whether to support PDCCH repetition,
- whether to support an SFN PDCCH repetition scheme (or SFN-PDCCH or SFN-CORESET) for CSS set,
- whether to support PDCCH repetition for CSS set, and
- whether to support simultaneous reception of PDCCHs of two or more different QCL types D.

At least one of the above-described embodiments may be applied to a case where the UE is configured with specific information related to the above-described embodiment by higher layer signaling (in a case where the specific information is not configured, the Rel-15/16 operation is applied, for example). For example, the specific information may be information indicating enabling of an SFN/FDM PDCCH repetition scheme (or SFN-PDCCH or SFN-CORESET), any RRC parameter for a specific release (for example, Rel. 17), or the like.

The UE capability, the specific information, or the like may be configured/reported for SFN-PDCCH and PDCCH repetition in common or may be configured/reported separately (by independent parameters).

Note that the first embodiment is applicable to a case where one or more TCI states are activated per CORESET without being limited to a case where the UE is configured with (or uses) an SFN PDCCH repetition scheme. The first embodiment may be applied to a case where HST scheme 0/scheme 1/scheme 2/network pre-compensation (NW pre-compensation) scheme is used by/configured for the UE.

The second embodiment is applicable to a case where two SS sets with a plurality of corresponding CORESETs are used for PDCCH without being limited to a case where the UE is configured with (or uses) an FDM PDCCH repetition scheme.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 16:
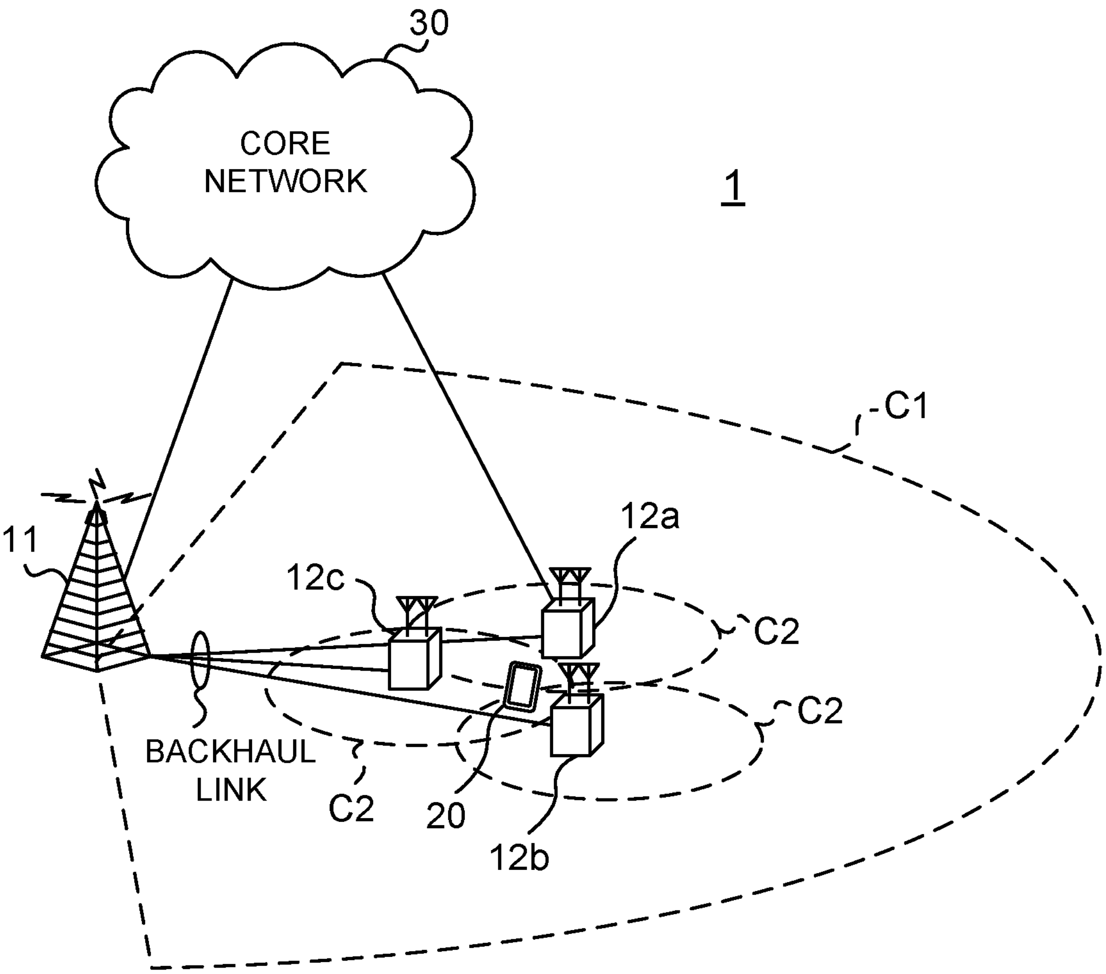
FIG. 16 is a diagram to show an example of a schematic structure of a radio communication system according to one embodiment.

FIG. 16 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 17:
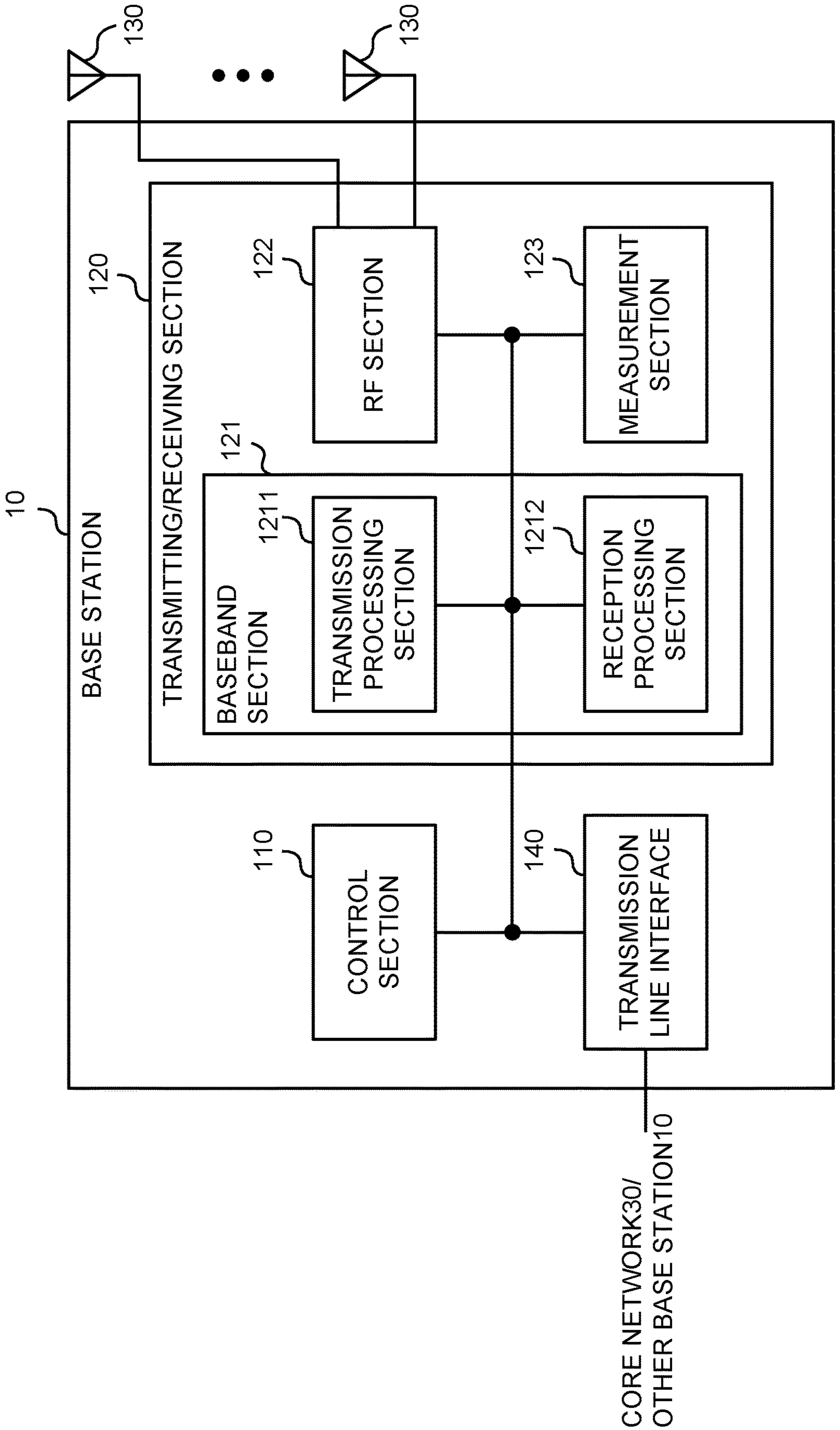
FIG. 17 is a diagram to show an example of a structure of a base station according to one embodiment.

FIG. 17 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/ receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the transmitting/receiving section 120 may transmit at least one of downlink control channels (Physical Downlink Control Channels (PDCCHs)) in a plurality of control resource sets (CORESETs) overlapped in time, to the user terminal 20.

The control section 110 may assume the user terminal 20 performing control to determine a PDCCH to monitor for the plurality of CORESETs, according to a transmission configuration indication state (TCI state) of only one CORESET selected based on a priority rule.

(User Terminal)

Figure 18:
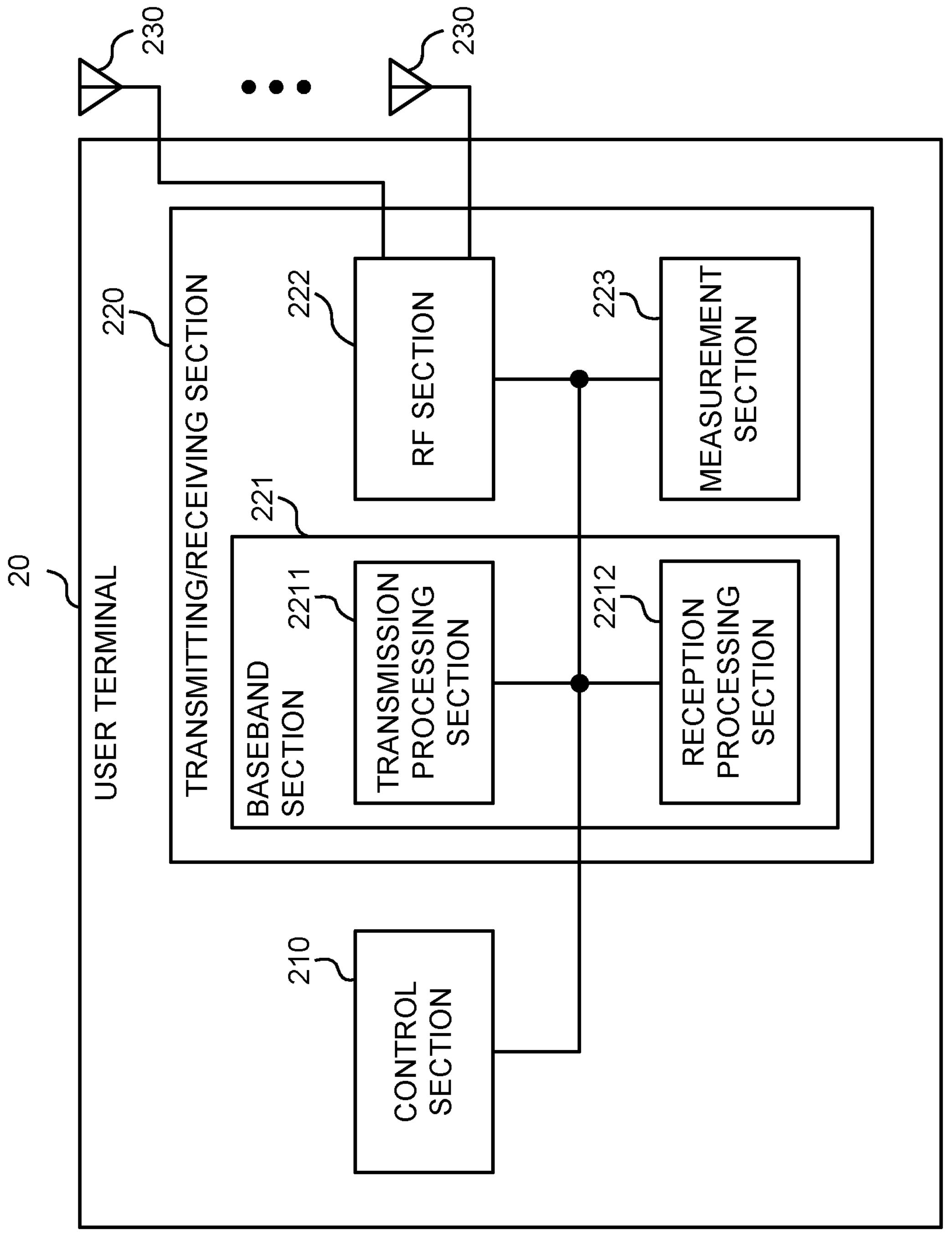
FIG. 18 is a diagram to show an example of a structure of a user terminal according to one embodiment.

FIG. 18 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the control section 210 may determine a downlink control channel (Physical Downlink Control Channel (PDCCH)) to monitor for PDCCHs in a plurality of control resource sets (CORESETs) overlapped in time, according to a transmission configuration indication state (TCI state) of only one CORESET selected based on a priority rule.

The transmitting/receiving section 220 may monitor the determined PDCCH.

The priority rule may be a rule for determining a CORESET corresponding to a common search space (CSS) set at a higher priority over a CORESET corresponding to a UE-specific search space (USS) set, among the plurality of CORESETs.

The priority rule may be a rule for making determination according to a priority order of a CORESET corresponding to a common search space (CSS) set with two active TCI states, a CORESET corresponding to a UE-specific search space (USS) set with two active TCI states, a CORESET corresponding to a CSS set with one active TCI state, and then a CORESET corresponding to a USS set with one active TCI state among the plurality of CORESETs.

The priority rule may be a rule for making determination according to a priority order of a CORESET corresponding to a common search space (CSS) set with two active TCI states, a CORESET corresponding to a CSS set with one active TCI state, a CORESET corresponding to a UE-specific search space (USS) set with two active TCI states, and then a CORESET corresponding to a USS set with one active TCI state among the plurality of CORESETs.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 19:
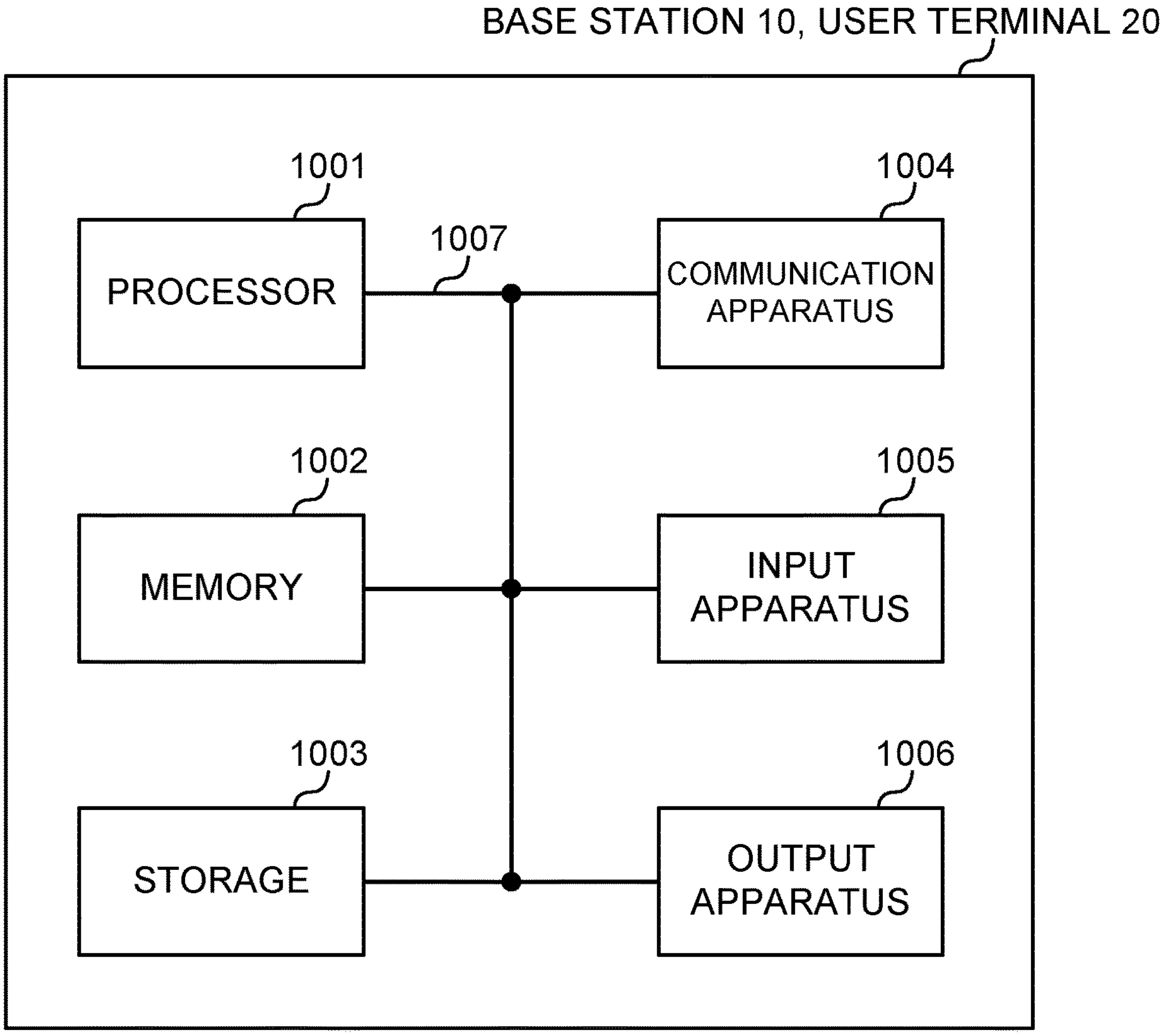
FIG. 19 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 19 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIS.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be indicated by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI)), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be a device mounted on a moving object or a moving object itself, and so on.

The moving object is a movable object with any moving speed, and naturally a case where the moving object is stopped is also included. Examples of the moving object include a vehicle, a transport vehicle, an automobile, a motorcycle, a bicycle, a connected car, a loading shovel, a bulldozer, a wheel loader, a dump truck, a fork lift, a train, a bus, a trolley, a rickshaw, a ship and other watercraft, an airplane, a rocket, an artificial satellite, a drone, a multicopter, a quadcopter, a balloon, and an object mounted on any of these, but these are not restrictive. The moving object may be a moving object that autonomously travels based on a direction for moving.

The moving object may be a vehicle (for example, a car, an airplane, and the like), may be a moving object which moves unmanned (for example, a drone, an autonomous car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor.

Figure 20:
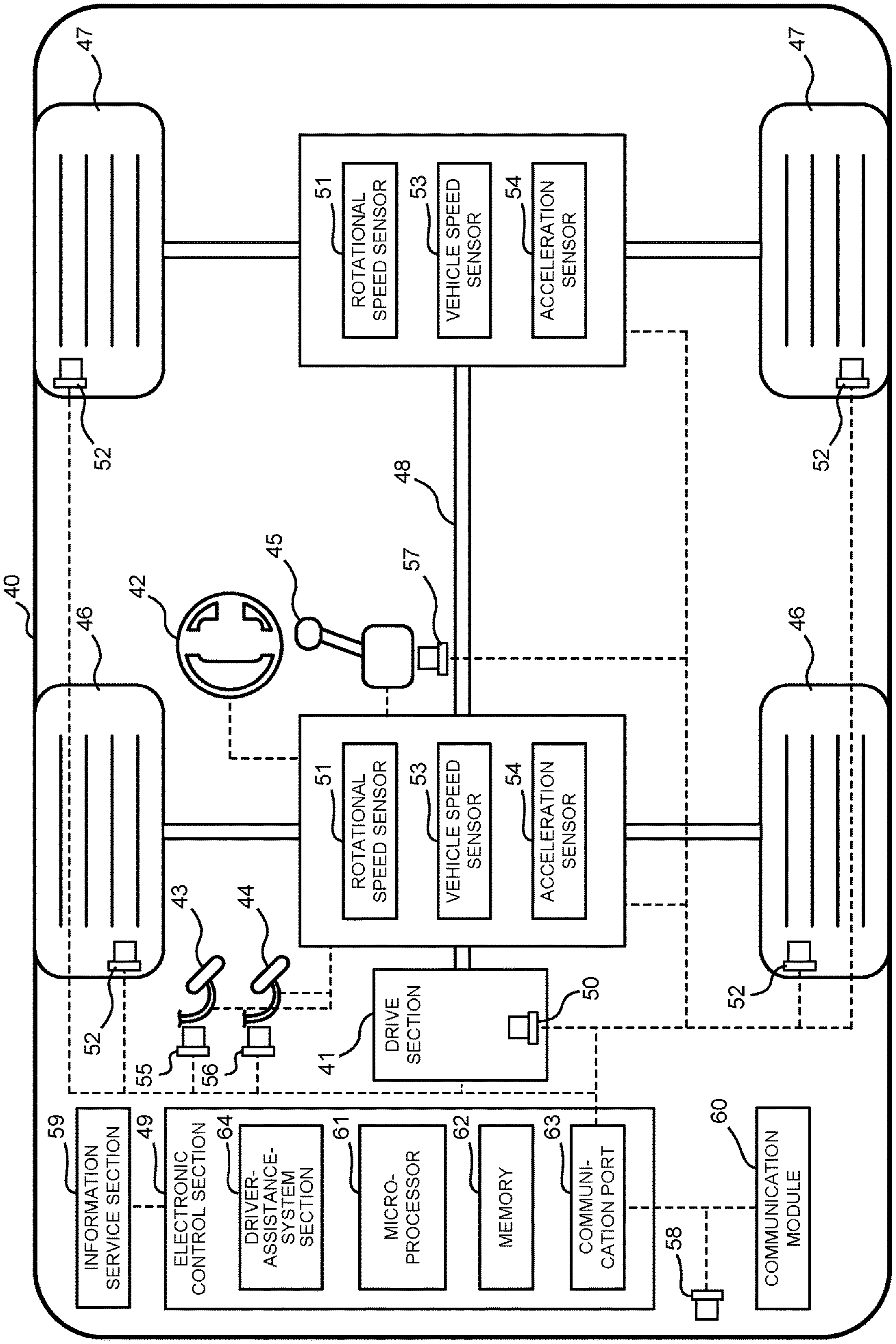
FIG. 20 is a diagram to show an example of a vehicle according to one embodiment.

FIG. 20 is a diagram to show an example of a vehicle according to one embodiment. As shown in FIG. 20, a vehicle 40 includes a driving section 41, a steering section 42, an accelerator pedal 43, a brake pedal 44, a shift lever 45, right and left front wheels 46, right and left rear wheels 47, an axle 48, an electronic control section 49, various sensors (including a current sensor 50, a rotational speed sensor 51, a pneumatic sensor 52, a vehicle speed sensor 53, an acceleration sensor 54, an accelerator pedal sensor 55, a brake pedal sensor 56, a shift lever sensor 57, and an object detection sensor 58), an information service section 59, and a communication module 60.

The drive section 41 includes, for example, at least one of an engine, a motor, and a hybrid of an engine and a motor. The steering section 42 at least includes a steering wheel, and is configured to steer at least one of the front wheels 46 and the rear wheels 47, based on operation of the steering wheel operated by a user.

The electronic control section 49 includes a microprocessor 61, a memory (ROM, RAM) 62, and a communication port (for example, an input/output (IO) port) 63. The electronic control section 49 receives, as input, signals from the various sensors 50 to 58 included in the vehicle. The electronic control section 49 may be referred to as an Electronic Control Unit (ECU).

Examples of the signals from the various sensors 50 to 58 include a current signal from the current sensor 50 for sensing current of a motor, a rotational speed signal of the front wheels 46/rear wheels 47 acquired by the rotational speed sensor 51, a pneumatic signal of the front wheels 46/rear wheels 47 acquired by the pneumatic sensor 52, a vehicle speed signal acquired by the vehicle speed sensor 53, an acceleration signal acquired by the acceleration sensor 54, a depressing amount signal of the accelerator pedal 43 acquired by the accelerator pedal sensor 55, a depressing amount signal of the brake pedal 44 acquired by the brake pedal sensor 56, an operation signal of the shift lever 45 acquired by the shift lever sensor 57, and a detection signal for detecting an obstruction, a vehicle, a pedestrian, and the like acquired by the object detection sensor 58.

The information service section 59 includes various devices for providing various pieces of information such as drive information, traffic information, and entertainment information, such as a car navigation system, an audio system, a speaker, a display, a television, and a radio, and one or more ECUs that control these devices. The information service section 59 provides various pieces of information/services (for example, multimedia information/multimedia service) for an occupant of the vehicle 40, using information acquired from an external apparatus via the communication module 60 and the like.

A driver-assistance-system section 64 includes various devices for providing functions for preventing an accident and reducing a driver's driving load, such as a millimeter wave radar, Light Detection and Ranging (LiDAR), a camera, a positioning locator (for example, a Global Navigation Satellite System (GNSS) and the like), map information (for example, a high definition (HD) map, an autonomous vehicle (AV) map, and the like), a gyro system (for example, an inertial measurement apparatus (inertial measurement unit (IMU)), an inertial navigation apparatus (inertial navigation system (INS)), and the like), an artificial intelligence (AI) chip, and an AI processor, and one or more ECUs that control these devices. The driver-assistance-system section 64 transmits and receives various pieces of information via the communication module 60, and implements a driving assistance function or an autonomous driving function.

The communication module 60 can communicate with the microprocessor 61 and the constituent elements of the vehicle 40 via the communication port 63. For example, via the communication port 63, the communication module 60 transmits and receives data (information) to and from the drive section 41, the steering section 42, the accelerator pedal 43, the brake pedal 44, the shift lever 45, the right and left front wheels 46, the right and left rear wheels 47, the axle 48, the microprocessor 61 and the memory (ROM, RAM) 62 in the electronic control section 49, and the various sensors 50 to 58, which are included in the vehicle 40.

The communication module 60 can be controlled by the microprocessor 61 of the electronic control section 49, and is a communication device that can perform communication with an external apparatus. For example, the communication module 60 performs transmission and reception of various pieces of information to and from the external apparatus via radio communication. The communication module 60 may be either inside or outside the electronic control section 49. The external apparatus may be, for example, the base station 10, the user terminal 20, or the like described above. The communication module 60 may be, for example, at least one of the base station 10 and the user terminal 20 described above (may function as at least one of the base station 10 and the user terminal 20).

The communication module 60 may transmit at least one of signals from the various sensors 50 to 58 described above input to the electronic control section 49 and information obtained based on the signals, to the external apparatus via radio communication.

The communication module 60 receives various pieces of information (traffic information, signal information, inter-vehicle distance information, and the like) transmitted from the external apparatus, and displays the various pieces of information on the information service section 59 included in the vehicle. The communication module 60 stores the various pieces of information received from the external apparatus in the memory 62 that can be used by the microprocessor 61. Based on the pieces of information stored in the memory 62, the microprocessor 61 may perform control of the drive section 41, the steering section 42, the accelerator pedal 43, the brake pedal 44, the shift lever 45, the right and left front wheels 46, the right and left rear wheels 47, the axle 48, the various sensors 50 to 58, and the like included in the vehicle 40.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced, modified, created, or defined based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a processor that determines physical downlink control channel (PDCCH) candidates to monitor for PDCCH monitoring occasions that overlap in time in multiple control resource sets (CORESETs), according to a quasi-colocation (QCL) type of a spatial reception parameter of a transmission configuration indication state (TCI state) of only one first CORESET, among the multiple CORESETs, selected based on a priority rule; and a receiver that monitors the PDCCH candidates determined, wherein when the multiple CORESETs are CORESETs for a single frequency network (SFN), the processor monitors the PDCCH candidates in the first CORESET and a second CORESET that is different from the first CORESET among the multiple CORESETs, and the PDCCH candidates monitored in the second CORESET are determined according to a same QCL type as the QCL type, and wherein when the first CORESET and the second CORESET have two activated TCI states, a QCL type of at least one TCI state of the two TCI states of the second CORESET is the same as a QCL type of one of the two TCI states of the first CORESET.

2. The terminal according to claim 1, wherein when the multiple CORESETs further include a CORESET used for PDCCH repetitive transmission, the processor applies a second priority rule that is different from the priority rule to select PDCCH candidates to monitor for PDCCH monitoring occasions of the CORESET used for the PDCCH repetitive transmission.

3. The terminal according to claim 2, wherein the priority rule and the second priority rule include monitoring of a CORESET corresponding to a common search space (CSS) set with a higher priority than a CORESET corresponding to a UE-specific search space (USS) set.

4. The terminal according to claim 1, wherein activation of the two TCI states is notified by a medium access control control element (MAC CE).

5. A radio communication method for a terminal, comprising:

determining physical downlink control channel (PDCCH) candidates to monitor for PDCCH monitoring occasions that overlap in time in multiple control resource sets (CORESETs), according to a quasi-colocation (QCL) type of a spatial reception parameter of a transmission configuration indication state (TCI state) of only one first CORESET, among the multiple CORESETs, selected based on a priority rule; and monitoring the PDCCH candidates determined, and when the multiple CORESETs are CORESETs for a single frequency network (SFN), monitoring the PDCCH candidates in the first CORESET and a second CORESET that is different from the first CORESET among the multiple CORESETs, wherein the PDCCH candidates monitored in the second CORESET are determined according to a same QCL type as the QCL type, and wherein when the first CORESET and the second CORESET have two activated TCI states, a QCL type of at least one TCI state of the two TCI states of the second CORESET is the same as a QCL type of one of the two TCI states of the first CORESET.

6. A base station comprising:

a transmitter that transmits, to a terminal, physical downlink control channel (PDCCH) candidates to monitor for PDCCH monitoring occasions that overlap in time in multiple control resource sets (CORESETs); and a processor that assumes that the terminal performs a control to select, based on a priority rule, the PDCCH candidates to monitor, and to determine the PDCCH candidates according to a quasi-colocation (QCL) type of a spatial reception parameter of a transmission configuration indication state (TCI state) of only one first CORESET, among the multiple CORESETs, and when configuring a single frequency network (SFN) in the multiple CORESETs, assumes that the terminal performs a control to monitor the PDCCH candidates in the first CORESET and a second CORESET that is different from the first CORESET among the multiple CORESETs and to determine the PDCCH candidates monitored in the second CORESET according to a same QCL type as the QCL type, wherein when the first CORESET and the second CORESET have two activated TCI states, a QCL type of at least one TCI state of the two TCI states of the second CORESET is the same as a QCL type of one of the two TCI states of the first CORESET.

7. A system comprising a terminal and a base station, wherein:

the terminal comprises:

a processor that determines physical downlink control channel (PDCCH) candidates to monitor for PDCCH monitoring occasions that overlap in time in multiple control resource sets (CORESETs), according to a quasi-colocation (QCL) type of a spatial reception parameter of a transmission configuration indication state (TCI state) of only one first CORESET, among the multiple CORESETs, selected based on a priority rule; and a receiver that monitors the PDCCH candidates determined, wherein when the multiple CORESETs are CORESETs for a single frequency network (SFN), the processor monitors the PDCCH candidates in the first CORESET and a second CORESET that is different from the first CORESET among the multiple CORESETs, and the PDCCH candidates monitored in the second CORESET are determined according to a same QCL type as the QCL type, and wherein when the first CORESET and the second CORESET have two activated TCI states, a QCL type of at least one TCI state of the two TCI states of the second CORESET is the same as a QCL type of one of the two TCI states of the first CORESET, and the base station comprises:

a transmitter that transmits the PDCCH candidates to the terminal in the PDCCH monitoring occasions that overlap in time.

* * * * *